United States Patent
Earthman et al.

(10) Patent No.: US 11,488,062 B1
(45) Date of Patent: Nov. 1, 2022

(54) DETERMINATION OF STRUCTURAL CHARACTERISTICS OF AN OBJECT

(71) Applicant: Perimetrics, LLC

(72) Inventors: James C. Earthman, Irvine, CA (US); Aboozar Mapar, Foothill Ranch, CA (US); Michael David Swinson, Santa Monica, CA (US); Dennis A. Quan, Jr., Cary, NC (US)

(73) Assignee: Perimetrics, Inc., Redmond, WA (US)

( * ) Notice: Subject to any disclaimer, the term of this patent is extended or adjusted under 35 U.S.C. 154(b) by 166 days.

(21) Appl. No.: 16/731,015

(22) Filed: Dec. 30, 2019

Related U.S. Application Data

(60) Provisional application No. 62/786,493, filed on Dec. 30, 2018.

(51) Int. Cl.
  *G06N 20/00* (2019.01)
  *G06K 9/62* (2022.01)

(52) U.S. Cl.
  CPC ........... *G06N 20/00* (2019.01); *G06K 9/6244* (2013.01); *G06K 9/6262* (2013.01); *G06K 9/6298* (2013.01)

(58) Field of Classification Search
  None
  See application file for complete search history.

(56) References Cited

U.S. PATENT DOCUMENTS

| | | | | |
|---|---|---|---|---|
| 9,753,962 | B2* | 9/2017 | Petschulat | G06F 16/2471 |
| 10,813,727 | B2* | 10/2020 | Sabina | A61B 1/24 |
| 10,888,400 | B2* | 1/2021 | Elbaz | A61B 5/1079 |
| 11,013,581 | B2* | 5/2021 | Sabina | A61C 9/0053 |
| 11,357,603 | B2* | 6/2022 | Elbaz | A61B 1/00009 |
| 2017/0311873 | A1* | 11/2017 | Ribnick | A61B 5/4557 |
| 2019/0147666 | A1* | 5/2019 | Keustermans | G06F 30/17 |
| | | | | 433/213 |
| 2020/0085548 | A1* | 3/2020 | Reynard | A61B 6/032 |
| 2020/0305808 | A1* | 10/2020 | Ezhov | A61B 5/7275 |
| 2020/0320006 | A1* | 10/2020 | Heremagalur Ramaprasad | G06F 9/3802 |
| 2022/0084267 | A1* | 3/2022 | Ezhov | A61B 5/7267 |
| 2022/0151756 | A1* | 5/2022 | Pesach | G16H 10/60 |

* cited by examiner

*Primary Examiner* — Anand P Bhatnagar
(74) *Attorney, Agent, or Firm* — Quan & Associates; Christopher Quan; Nancy Quan

(57) ABSTRACT

The present invention relates generally to a system and method for measuring the structural characteristics of an object. The object is subjected to an energy application processes and provides an objective, quantitative measurement of structural characteristics of an object. The system may include a device, for example, a percussion instrument, capable of being reproducibly placed against the object undergoing such measurement for reproducible positioning. The invention provides for a system and methods for analyzing measured characteristics utilizing machine learning to create a system for predicting pathologies from measurements.

20 Claims, 18 Drawing Sheets

DETERMINATION OF STRUCTURAL CHARACTERISTICS OF AN OBJECT

CROSS-REFERENCE TO RELATED APPLICATIONS

This application claims the benefit and priority of the following United States Provisional Patent Applications: Ser. No. 62/786,493, filed Dec. 30, 2018, entitled "DETERMINATION OF STRUCTURAL CHARACTERISTICS OF AN OBJECT", the contents of all of the foregoing applications are hereby incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

This invention relates generally to evaluation of the structural properties of an object. Specifically, it relates to aided evaluation of the structural characteristics that reflects the integrity of an object using a controlled energy application thereon as well as using machine learning for facilitating the evaluation of the structural characteristics that reflect the integrity of an object using a controlled energy application thereon.

BACKGROUND OF THE INVENTION

Every object, for example, any structure, either anatomical or non-anatomical including industrial or mechanical, exhibits some kind of structural characteristics that may change with time when the structures are being used in any manner, including those that are merely left standing in place in the environment. For changes that are easily discernable visually or revealed through simple testing, measuring the changes may be easily done. However, when such changes are not easily discernable visually or revealed through simple testing, more complicated testing is needed. Testing to find out such changes is important for the health and longevity of the structure, because such changes may eventually develop into forms of defects that are not repairable over time if left unchecked or untreated. To determine the characteristics of the structure, a number of ways may be used, but a majority of tests are likely destructive or invasive if such changes are internal.

When an object is subjected to an impact force, a stress wave is transmitted through the object. This stress wave causes deformations in the internal structure of the object. As the object deforms it acts, in part, as a shock absorber, dissipating a portion of the mechanical energy associated with the impact. The ability of the object to dissipate mechanical energy, commonly referred to as the "damping capacity" of the object, depends on several factors, including the type and structural integrity of the materials making up the object.

There are instruments that are capable of measuring the damping capacity of an object. An example of such an instrument is described in U.S. Pat. No. 6,120,466 ("the '466 patent"). The instrument disclosed in the '466 patent provides an objective, quantitative measurement of the damping capacity of an object, referred to as the loss coefficient 17. The energy of an elastic wave attenuates relatively quickly in materials with a relatively high loss coefficient, whereas the energy of an elastic wave attenuates relatively slowly in materials with a relatively low loss coefficient.

The damping capacity of an object is an important parameter in a wide variety of applications, including anatomical or non-anatomical objects. For example, in the field of dentistry, when a healthy tooth is subjected to an impact force, the mechanical energy associated with the impact is primarily dissipated by the periodontal ligament. Changes in the structure of the periodontal ligament that reduce its ability to dissipate the mechanical energy associated with an impact force, and thus reduce overall tooth stability, can be detected by measuring the loss coefficient of the tooth.

Objects, whether anatomical or non-anatomical, for example, dental systems, either natural teeth or implants, may also develop defects over time. Some defects require a dental restorative procedure to be performed. Such procedures can be invasive and expensive and incur long recovery times, especially if such defects are not easily discernable until they have developed into more discernable ones that may be severe. There is a significant need for technologies that can quickly validate and pinpoint the kind of issues present and their locations when before the issue becomes severe and/or prior to a disruptive procedure so as to reduce the risk of procedures being performed ineffectively or unnecessarily.

SUMMARY OF THE PRESENT INVENTION

The present invention relates to a system and method for measuring and evaluating structural characteristics of an object, whether anatomical or non-anatomical, in a non-invasive manner and/or using a non-destructive method of measurement. Structural characteristics of an object may be identified based on measurements of the same or other objects previously made using and captured by the system.

In general, the system may include the following aspects and/or a sub-combination thereof, which are discussed additionally below: an aspect including a first program logic module ("Acquisition") that includes the functions for collecting device measurements of physical objects (a "Collection" aspect), which may be anatomical or non-anatomical; and accepting, from a user, expert annotations on device measurements regarding the structural characteristics of the measured physical objects (an "Annotation" aspect); another aspect including a program logic module ("Training") executing a training cycle for training a machine learning algorithm on a ground truth dataset including stored device measurements and/or expert annotations to create a transformation function; and a further aspect including a program logic module ("Prediction") exposing a production interface for performing predictions on the device measurements utilizing the transformation function.

In some exemplary embodiments, the system may include a first program logic module ("Acquisition") for collecting device measurements of physical objects, which may be anatomical or non-anatomical; and accepting, from a user, annotations, which may be expert annotations, on device measurements regarding the structural characteristics of the measured physical objects; a second program logic module ("Training") executing a training cycle for training a machine learning algorithm on a ground truth dataset including stored device measurements and annotations to create a transformation function; and a third program logic module ("Prediction") exposing a production interface for performing predictions on the device measurements utilizing the transformation function.

In another exemplary embodiment, the system may include a first program logic module ("Collection") for collecting device measurements of physical objects; a second program logic module ("Annotation") exposing an annotation user interface for accepting, from a user, annotations on device measurements regarding the structural characteristics of the measured physical objects; a third program logic module ("Training") executing a training cycle for training a machine learning algorithm on a ground truth dataset comprised of stored device measurements and annotations to create a transformation function; and a fourth program logic module ("Prediction") exposing a production interface for performing predictions on the device measurements utilizing the transformation function.

In one aspect ("Collection"), the present invention relates to a system for compiling test results from a multitude of objects which may or may not include test results of an object tested over a period of time. In some embodiments, each of the test results may be generated using an instrument having housing with an open end or closed end with an energy application tool capable of applying energy to an object to generate a response, for example, a percussive response that may reveal the structural characteristics of the object without substantially affecting the existing structural characteristics of the object. Energy may be in the form of mechanical, sound or electromagnetic energy.

For example, the device may include a housing with an open end and a longitudinal axis including an energy application tool mounted inside the housing for movement, from a resting to an active configuration using a drive mechanism supported inside the housing. The housing may include an object contacting portion at its open end or a sleeve may protrude from the open end of the housing for a distance and may include an object contacting portion at its open end adapted for resting the device on at least a portion of the object, and adapted for activating the drive mechanism, hence the energy application tool to impact the object when the object contacting portion of either the housing or the sleeve is resting on at least a portion of the object and for measuring a response after impact and generating a response versus time curve or graph. The response versus time curve or graph may be annotated and validated. The response may be captured by a computer coupled to the device, and the response versus time curve and one or more associated annotations may be utilized to generate a predictive model. A transformation function may be generated and utilized to predict at least one structural characteristic of a newly tested object, using the above described device with the transformation function without the need for further annotation and validation. The phrase "newly tested object" may include a different object never tested before, and an object that has been previously tested before at a different time frame.

The system and method may include a device having an energy application tool capable of applying energy to an object to generate a response, for example, a percussive response that may reveal the structural characteristics of the object without substantially affecting the existing structural characteristics of the object. The energy application tool may be programmed to impact an object a certain number of times per minute at substantially the same speed for a certain time interval during testing. The system may measure, for a time interval, a percussive response such as energy reflected from the object as a result of the energy application, for example, by tapping or applying energy, or the deceleration information of the energy application tool, namely energy return. The response may be fed to a computer and the information is recorded or compiled for analysis by the system, which may include creating a percussive response profile, for example, an energy return curve or energy return graph (ERG) as a time-energy profile, frequency-energy profile, based on the energy reflected from the object during the time interval, and/or evaluating the, for example, percussive response profile, for example, a time-energy profile, to determine the structural characteristics of the object, for example, vibration damping capacities; acoustic damping capacities; defects including inherent defects in, for example, the bone or the material that made up the object; cracks, micro-cracks, fractures, microfractures; loss of cement seal; cement failure; bond failure; microleakage; lesions; decay; structural characteristic of the foundation or environment to which the object may be anchored or present in, structural integrity in general or structural stability in general.

The system of the present invention, for example, may include a device for performing a percussion action on an object. The percussion device useful in the present invention may come in different configurations, and the testing results produced from some configurations may generate better models than other configurations. In general, the device includes a percussion instrument, capable of being reproducibly placed directly on the object undergoing such measurement for reproducible measurements.

In some exemplary embodiments of the invention, the device used may include a housing with a hollow interior and an open end through which energy may be applied by an energy application tool, including any tool capable of applying any types of energy to the object including mechanical, sound or electromagnetic energy may be positioned. According to some embodiments, a tool capable of applying mechanical energy to the object, such as a tapping rod or impact rod may be positioned or mounted inside the housing passes through to reach the object undergoing measurement. According to some other embodiments, an electromagnetic energy source of any frequency, such as light energy, for example, may be positioned inside the housing. According to a further example, a sound energy source such as an ultrasonic transducer or any acoustic energy source, may be positioned inside the housing.

The device of the present invention may be, for example, a percussion instrument, which may include a handpiece having a housing having a longitudinal axis, with an open end and an energy application tool, for example, a tapping rod, or impact rod mounted inside the housing for axial movement along the longitudinal axis of the housing, or for oscillatory movement about the longitudinal axis of the housing. In some embodiments, the housing may include an object contacting portion capable of being reproducibly placed in contact with the object undergoing such measurement. In some other embodiments, the housing may include at least a portion, such as a sleeve portion extending from the housing for a distance, capable of being reproducibly placed in contact with the object undergoing such measurement. The energy application tool, such as a tapping rod, may have a length and positioned inside the housing and may be programmed to impact an object a certain number of times per minute at substantially the same speed and the deceleration information of the tool or the response of the object from the impact is recorded or compiled for analysis by the system. In some embodiments, the device and hardware may communicate via a wire connection. In some other embodiments, the device and hardware may communicate via a wireless connection.

The system and method useful for performing measurement on an object and for capturing the measurements may include a device having an energy application tool capable of applying energy to an object to generate a measurement. For example, a percussion device may be useful in the present invention and may come in different configurations and forms, for example, a desktop or a portable device such as a handheld device and the testing results produced from some configurations may generate better models than other configurations.

In some embodiments, and the energy application tool, for example, a tapping rod, has a length with a retracted or resting form or configuration and an extended or active form or configuration, the retracted form being retracted from or substantially coextensive with the open end of the housing if the energy application tool is a tapping rod. The movement of the energy application tool, for example, a tapping rod, may be effected by a drive mechanism mounted inside the housing for driving the tapping rod axially within the housing between the aforementioned retracted position and extended position during operation. In the extended position, the free end of the tapping rod is capable of extending or protruding from the open end of the housing. In some other embodiments, the energy application tool, for example, a tapping tool, may be a form substantially parallel to the longitudinal axis of the housing with a tip portion of the tool being substantially perpendicular to the longitudinal axis housing in a resting form or configuration, and move to the active form or configuration where the energy application tool makes an acute angle with the longitudinal axis of the housing, while the tip of the tool remains substantially perpendicular to the longitudinal axis of the housing, by rocking back and forth about a pivot point on the longitudinal axis. In other words, the energy application tool may oscillate from the substantially parallel position to the longitudinal axis of the housing to a position making an acute angle with the longitudinal axis of the housing at a pivot point. The energy application tool may be held either horizontally or in other positions during measurement, and may have a tip portion that is substantially perpendicular to the major portion of the tool and maintains a constant length either at rest or at impact. The movement of the energy application tool, for example, a tapping rod, may be effected by a drive mechanism mounted inside the housing for driving the tapping rod from a substantially parallel position to the longitudinal axis of the housing to a position making an acute angle with the axis at a pivot point and back again, while the tip oscillates up and down in turn. The movement of the energy application tool, for example, a tapping rod, may be effected by a drive mechanism mounted inside the housing for driving the energy application tool.

The drive mechanism may be, for example, an electromagnetic mechanism, and may include an electromagnetic coil. In some embodiments, the drive mechanism may include a permanent magnet secured to the back end of the energy application tool, for example, the tapping rod, and the magnetic coil may lie axially behind this permanent magnet. Together with the back part of the handpiece housing and any electrical supply lines, the magnetic coil forms a structural unit which may be integrally operational and which may be, for example, connected to the remaining device by a suitable releasable connection, for example, a screw-type connection or a plug-type connection. This releasable connection may facilitate cleaning, repairing and others. In some other embodiments, the drive mechanism may be an electromagnetic mechanism and may include an electromagnetic coil and a permanent magnet secured to the back end of the energy application tool, for example, the tapping rod, by an interface, for example, a coil mount. The coil, for example, an electromagnetic coil may lie axially behind the permanent magnet, for example. The electromagnetic coil may also act directly on a metallic or conductive component, such as a ferromagnetic component. Other forms of linear motors may also be employed.

The energy application tool, such as the tapping rod, may be located in the front part of the housing and the mounting mechanism for the tapping rod may include frictionless bearings. These bearings may include one or more axial openings so that the neighboring chambers formed by the housing and the tapping rod are in communication with one another for the exchange of air, dependent on how much information is expected from the test.

For a given energy application tool, for example, for a physical tool such as a tapping rod, the variation of impact force may be effected by, for example, varying voltage, current or both, may vary the coil drive times (varying the length of time the coil is energized or activated), may vary the velocity of the tapping rod traveling towards the object at impact, may vary the coil delay times (varying the time between driving activities), may vary the number of coil energizations (i.e. varying the number of drive pulses applied), polarity of the coil and/or a combination thereof.

According to some embodiments, the drive mechanism may include a measuring device, for example, a piezoelectric force sensor, located within the handpiece housing for coupling with the energy application tool, such as the tapping rod. The measuring device may be adapted for measuring the deceleration of the tapping rod upon impact with an object during operation, or any vibration caused by the tapping rod on the specimen. The piezoelectric force sensor may detect changes in the properties of the object and may quantify objectively its internal characteristics. Data transmitted by the piezoelectric force sensor may be processed by a system program, to be discussed further below.

According to some other embodiments, the drive mechanism may include a linear variable differential transformer adapted for sensing and/or measuring the displacement of the energy application tool such as the tapping rod, before, during and after the application of energy. The linear variable differential transformer may be a non-contact linear displacement sensor. The sensor may utilize inductive technology and thus capable of sensing any metal target. Also, the noncontact displacement measurement may allow a computer to determine velocity and acceleration just prior to impact so that the effects of gravity may be eliminated from the results. Communication between the drive mechanism and the energy application may be wired or wireless.

Located at the open end of the housing may be an object contacting portion which may or may not include a sleeve. In some embodiments, the open end of the housing may be placed directly in contact with the object during measurement, thus stabilizing the device on the object. In some other embodiments, the sleeve may attach and/or surround at least a length of the free end of the housing and protrudes from the housing at a distance substantially coextensive with the end of the tapping rod in its extended form if the tapping rod moves axially. Thus, the length of the sleeve may be dependent on the length of protrusion of the extended tapping rod desired. The free end of the sleeve may be placed against an object undergoing measurement. The sleeve may be placed directly in contact with the object during measurement, thus stabilizing the device on the object. Other features may be included to further stabilize the device and may also built in some repeatability of placement of the device on an object, as discussed below.

In other exemplary embodiments of the invention, the device may be as described in the above exemplary embodiments, except that the sleeve may include a tab protruding from at least a portion of its end so that when the open end of the sleeve is in contact with at least a portion of a surface of the object undergoing the measurement, the tab may be resting on a portion of the top of the object. The tab and the sleeve together may assist in the repeatable positioning of the handpiece with respect to the object; thus results are more reproducible than without the tab. In rare situations, the tab may not protrude at all to allow testing at a lower position on the object. The tab may be substantially parallel to the longitudinal axis of the sleeve. In one aspect, the surface of the tab in contact with an object may be contoured, a concave or a convex surface, to be better positioned on the top of the object, for example, a tooth. In another aspect, the surface of the tab in contact with an object may be flat to accommodate the topography of the object, for example, a flat surface. In a further aspect, the surface of the tab in contact with an object have include a groove or groove to accommodate an object with uneven surfaces. In addition, the tab may be adapted for repetitively placed substantially at the same location on the top of the object every time. In some embodiments, the tab may be substantially parallel to the longitudinal axis of the sleeve.

On rare occasions, where the tab may interfere with a stable position on, for example a dental implant transfer abutment, a sleeve portion without a tab may be used for more stable placement lower on the abutment.

In a further exemplary embodiment of the invention, the sleeve may include not only a tab, but also a feature component, for example, a ridge, protrusion or other feature substantially orthogonal to the surface of the tab on the side adapted for facing the surface of an object. For example, for teeth, the ridge or protrusion may nest between adjacent teeth or other orthogonal surface and may thus aid in preventing any substantial lateral or vertical movement of the tab across the surface of the object and/or further aid in repeatability. The tab may be of sufficient length or width, depending on the length or width of the top portion of the object so that the ridge or protrusion may be properly located during operation. Again, the tab and the feature also aid in the reproducible results than without the tab.

In the exemplary embodiments described above, the device may be of any form factor, as noted above, including a handpiece with a longitudinal housing for housing the parts of the device as described above, or a desktop, or any form that is portable. The device, for example, any portable form or a handpiece may be held at any angle to the horizontal during testing.

The stabilization of the instrument effected by a tab or a tab and/or component may minimize any jerky action by the operator that may confound the testing results, for example, any defects inherent in the bone structure or physical or industrial structure may be masked by jerky action of the tester. This type of defect detection is important because the location and extent of the defect may impact dramatically upon the stability of the implant or physical or industrial structures. Generally, when lesions are detected, for example, in an implant, such as a crestal or apical defect, the stability of the implant may be affected if both crestal and apical defect are present. In the past, there is no other way of gathering this type of information other than costly radiation intensive processes. With the present device, this type of information may be gathered, and may be done in an unobtrusive, non-invasive manner without radiation.

In a further exemplary embodiment of the invention, an inclinometer may be present, for example, as part of an electronic control system of any of the above described exemplary embodiments, which may trigger an audible warning when the device is outside of the angular range of operation; for example, for a tapping rod, it may trigger the warning when it is plus/minus approximately 45 degrees, more for example, 30 degrees from horizontal to return the device to the horizontal orientation.

In yet another exemplary embodiment of the invention, any of all of the exemplary embodiments described above may also include a force sensor, not for sensing or measuring the force exerted by the energy application tool on an object during testing, or the response after impact of the energy application tool, but for sensing and/or monitoring that a proper contact force is exerted by the sleeve portion on the object undergoing measurement. As mentioned above, during measurement, for example, the device may contact the object with the end of the sleeve portion. The contact force may vary depending on the operator. It is desirable that the force be consistently applied in a certain range and that range not be excessive, independent of the operator. A force sensor may be included in the device for sensing this force and may be accompanied by visual signal, voice or digital readout. This sensor may be employed also for assuring that proper alignment against the object during measurement is obtained. The sensor, for example a force sensor, may be in physical proximity and/or contact and/or coupled with at least a portion of the device other than the energy application tool; for example, it may be in physical proximity and/or contact and/or coupled with the housing and/or sleeve portion, if the open end of the sleeve portion includes an object contacting portion.

In general, the sensor may surround the energy application tool and not be in physical contact with the tool. For example, the sensor maybe positioned such that the energy application tool, even a physical tool, may pass through it to impact the object undergoing measurement. The sensor may include strain gauges, piezoelectric elements, a sensing pad or any other sensor that may be capable of being sandwiched. The sensor, for example the force sensor, may be disposed anywhere inside the housing and be in physical proximity and/or contact and/or coupled with at least a portion of the device other than the energy application tool; for example, it may be in physical proximity and/or contact and/or coupled with the housing and/or sleeve portion, if the open end of the sleeve portion includes an object contacting portion, as noted above. In some embodiments of the invention, the sensor may include at least one strain gauge for sensing. The strain gauges may be attached or mounted to a cantilever between the device housing and the sleeve portion so that when the object contacting portion of the sleeve portion is pressed on the object it also deforms the cantilever which is measured by the strain gauge, thus providing a force measurement. In some embodiments, multiple strain gauges mounted to a single or to separate cantilevers may be utilized. The cantilever(s) may also, for example, be present on a separate component from the rest of the housing or sleeve portion, such as, for example, on a mounting device. In some other embodiments of the invention, the sensor may include a sensing pad which may be positioned between a rigid surface and a sliding part so that when the pad is pressed or squeezed as the sliding part moves towards the rigid surface, the force is measured.

According to some embodiments, the rigid surface may be, for example, a coil interface that holds the electromagnetic coil in the drive mechanism within the device housing of any of the above or below exemplary embodiments. The sliding part may be a force transfer sleeve-like component disposed inside the housing and coupled to the object contacting portion of the sleeve portion and adapted to slide inside the housing when a force is exerted by the object contacting portion of the sleeve portion on an object. In some embodiments, it may be disposed inside the sleeve portion. The sliding distance may be very small, for example, in the order of about (in millimeters or mm) 0.3 mm to about 1 mm, more for example about 0.5 mm. The sensing pad may include a layer structure, which may be generally referred to as a "Shunt Mode FSR" (force sensing resistor) that may change resistance depending on the force applied to the pad, to provide a force measurement. According to some other embodiments, the force transfer sleeve-like component may be biased forward by a spring, so that when force is applied by the object contacting portion of the sleeve portion on the object, the force transfer sleeve-like portion may transfer the force against the spring. According to one aspect, the force sensing may be done by a linear position sensor, which would know, for example, that if the force transfer sleeve-like portion is at position X, a force of Y has to be applied to it (against the reaction force of the spring) to move it to that position. According to another aspect, the force sensing may be performed by an optical sensor, for optically sensing the position of the moving part, when it is pushed against a spring, In yet some other embodiments of the invention, the relative position of the object contacting portion of the sleeve portion on the object may be determined by having one or more strain gauges which may be attached at one end to a moving part, for example, the force sensor sleeve-like component, and the other end to a static element, for example, the housing. In a further embodiment of the invention, the device may include piezoelectric elements for directly measuring the force. In yet a further embodiment of the invention, a hall effect sensor may be used to detect a change in the magnetic field when a magnet (attached to the moving element) is moving relative to the position of the sensor. In yet some other embodiments of the invention, a capacitive linear encoder system, like that found in digital calipers may be used to measure the force.

In addition to monitoring and sensing the contact force exerted on the object by the operator when the sleeve portion contacts the object, the sensors may also be configured to activate the device when the correct amount of force is exerted on the object by the sleeve portion.

Though the sensor is not physically or mechanically coupled to the energy application tool, it may be in electronic communication with the energy application tool and may act as an on/off switch for the device or instrument, as noted above. For example, when a proper force is exerted on the object by the object contacting portion of the sleeve, it may trigger the activation mechanism of the device or instrument to activate the movement of the energy application tool to start a measurement. Thus, no external switches or push buttons are needed to activate the on and off of the system, as noted above. The indication of the proper force may be indicated by visible or audible signals.

The sleeve portion may be mounted onto a force transfer sleeve-like component, or force transfer member, that forms a permanent part of the front of the housing or protrudes from it, and shields the energy application tool, for example, the tapping rod, from damage when no sleeve portion is present, for example, the sleeve portion may form part of a disposable assembly, as discussed below. The force transfer sleeve-like component sits around the energy application tool, for example, a tapping rod; and may surround the energy application tool, is held at the front by the housing and mounts onto the front of the electromagnetic coil at the rear. The force transfer sleeve-like component may be adapted to slide a small amount, and in doing so, may act on a force sensor, for example, a force sensitive resistor, located between the back surface of the force transfer sleeve-like component and the coil mount. The energy application tool, for example the tapping rod may be triggered when the object contacting portion of the sleeve portion is pushed against an object undergoing measurement; for example, a tooth and a force may be detected. When a correct force within a certain range is detected, the instrument is turned on to start the measurement.

As mentioned above and in all the embodiments of the sensor, the sensor may be arranged to form a channel through which the energy application tool, such as a tapping rod, may pass through to impact the object undergoing measurement, i.e. surrounds the tapping rod.

If the device is oriented such that the axis of operation is greater than about 45 degrees, more for example, greater than about 30 degrees from horizontal when a push force is sensed on the object contacting portion of the sleeve portion, it may result in a warning sound being emitted by a speaker located on the device, such as the printed circuit board (PCB) within the device. In such circumstances, the percussion action will not begin until the device is returned to an acceptable angle. In some instances, if the percussion action has started when the above mentioned above-mentioned departure from the range is detected, the device may not actually stop operation, but may simply be sounding an alarm, so that corrections may be made.

In still a further exemplary embodiment of the invention, any of the above described exemplary embodiments, the system and method may also include a device capable of operating by holding the device at varying angles from the horizontal and modulating the energy application process to mimic a substantially horizontal position during measurement may provide a system that may apply the optimal amount of energy to an object in all situations. In some embodiments, the device may exert a substantially the same impact force on the object in various angles from the perpendicular direction of the object surface, as if the device is operating so that the direction of propagation is perpendicular to the surface of the object. Thus, whether the device is operating at about plus/minus 45 degrees, more for example, about plus/minus 30 degrees from the perpendicular direction with respect to the object surface, the device may still generate about the same amount of an equivalent impact force, for example, about 20-30 newtons, for optimal results.

The object may be subjected to an energy application process and the system is adapted for providing an objective, quantitative measurement of structural characteristics of the object after the energy application process. The drive mechanism supported inside the housing for activating the energy application tool between the resting and active configurations to apply a set amount of energy at a horizontal orientation; with an inclinometer adapted to measure inclination of the energy application tool relative to the horizontal. For a given object, the drive mechanism varies the amount of energy applied to activate the energy application tool between the resting and active configurations based on the inclination to at least approximate the set amount of energy at inclinations other than horizontal. Thus, the same drive mechanism noted above to vary the amount of energy applied (e.g. varying voltage, current or both), may vary the coil drive times (varying the length of time the coil is energized or activated), may vary the coil delay times (varying the time between driving activities), may vary the number of coil energizations (i.e. varying the number of drive pulses applied), polarity of the coil and/or a combination thereof, for the different types of objects mentioned above, and be applicable for modulating the energy application process to mimic a substantially horizontal position during measurement. These factors, including varying power, drive times, polarity and delay times may be managed through varying the firmware settings for power, drive time, number of drives, polarity and drive delay of the energizing of the coil for the desired results. Without wishing to be bound to any particular theory, it is surmised multiple variations may be employed to achieve the desired result and the firmware may be designed to select a particular solution or to select an optimal solution for certain instances.

The system and method of the present invention may, such as increase flexibility of operation, for example, to adapt for reaching hard to reach objects, both anatomical and non-anatomical, to detect any abnormalities that may be present in an object to generate more reproducible measurements, and also to better be able to detect any abnormalities that may be present in an object. The device may include a housing with a hollow interior and an open end through which an energy application tool, including any tool capable of applying any types of energy to the object, for example, a tool capable of applying mechanical energy to the object, such as a tapping rod, positioned inside the housing passes through to reach the object undergoing measurement, an electromagnetic energy of any frequency, for example, light, a sound wave such as acoustic energy.

For example, the system may include a device for performing a percussion action on an object. The device, having a housing with a hollow interior and an open end through which energy may be applied by an energy application tool, including any tool capable of applying any types of energy to the object including mechanical, sound or electromagnetic energy may be positioned. In some embodiments, a tool capable of applying mechanical energy to the object, such as a tapping rod may be positioned inside the housing passes through to reach the object undergoing measurement. In some other embodiments, an electromagnetic energy source of any frequency, such as light energy, for example, may be positioned inside the housing. In a further example, a sound energy source such as an ultrasonic transducer or any acoustic energy source, may be positioned inside the housing.

The energy application tool may be held either horizontally or in other positions during measurement, and may have a tip portion that is substantially perpendicular to the major portion of the tool and maintains a constant length either at rest or at impact. In this latter embodiment, if the tool is a mechanical tool, such as a tapping rod, it may or may not include a removable tool tip that is substantially perpendicular to the longitudinal axis of the tool and housing.

The energy application tool, such as the tapping rod, may be programmed to strike an object a certain number of times per minute at substantially the same speed and the deceleration information may be recorded or compiled for analysis by the system, as noted above. The sleeve portion, in addition to aiding in positioning the device, may also aid in attenuating any vibrations caused by the impact so as to not disturb the sensitive measurements, if it is of a material having some damping properties.

For electromagnetic energy, the energy application may be in the form of pulses or energy bursts which may be programmed to impact an object a certain number of times per minute with substantially the same amount of energy each time and the effect on the object may be recorded or compiled for analysis by the system. In some instances, the repeated impact may provide an average measurement that may be better representative of the actual underlying property. The sleeve portion, in addition to aiding in positioning the device, may also aid in attenuating any vibrations caused by the impact so as to not disturb the sensitive measurements, if it is of a material having some damping properties.

Upon activation of, for example, a mechanical energy application tool, for example, the pressing of a finger switch on the device, or activated when a certain amount of force is exerted by the contact portion of the housing or the sleeve, as described above, a magnetic coil within the device propels the energy application tool, such as a tapping rod to extend at a speed towards an object undergoing measurement and strike or impact the object or specimen, for example, multiple times per measuring cycle with an impact force. The impact force on the object may create stress waves that traveled through the energy application tool, such as the tapping rod and the deceleration of the tool such as the tapping rod upon impact with the object may be measured by a measuring or sensing device or mechanism located in the device and transmitted to the rest of the system for analysis. The system may measure, for a time interval, a percussion response such as energy reflected from the object as a result of the energy application, for example, by tapping or applying energy, which may include creating a percussion response profile, for example, a time-energy profile, frequency-energy profile, based on the energy reflected from the object during the time interval, and/or evaluating the percussion response profile, for example, time energy profile to determine the damping capacity of the object or other characteristics. The measuring device or sensing mechanism may detect characteristics of the effects from the impact of the energy application tool with the object. In general, the measuring device or sensing mechanism may be physically coupled to, functionally coupled to or otherwise in contact with the energy application tool such that it may detect characteristics of the impact. The coupling may be wired or wireless.

In some embodiments, the measuring device or the sensing mechanism utilized for analysis of the object may include sensors for sensing and/or measuring the response either form the object or the energy application tool during measurement. In one aspect, the drive mechanism may include a sensing and/or measuring device, for example, a piezoelectric force sensor, or a piezoelectric sensing element, located within the housing for coupling with the energy application tool, such as the tapping rod and may generally produce an electrical signal or change in response to mechanical energy, such as a change in pressure on the piezoelectric sensing element. A piezoelectric wire may also, for example, be loaded into the energy application tool. The measuring device may be adapted, for example, for measuring the deceleration of the tapping rod upon impact with an object during operation, or any vibration caused by the tapping rod on the specimen. The piezoelectric force sensor may detect changes in the properties of the object and may quantify objectively its internal characteristics. Data transmitted by the piezoelectric force sensor may be processed by a system program, to be discussed further below. In another aspect, the measuring device or sensing mechanism may also include other forms of sensing elements, such as, for example, a linear variable differential transformer adapted for sensing and/or measuring the displacement of the energy application tool such as the tapping rod, before, during and after the application of energy. The linear variable differential transformer may be a non-contact linear displacement sensor. The sensor may utilize inductive technology and thus capable of sensing any metal target. Also, the noncontact displacement measurement may allow a computer to determine velocity and acceleration just prior to impact so that the effects of gravity may be eliminated from the results. In other aspects, the sensing and/or measuring device may sense the position of the energy application tool due to changes in voltage in the transformer due to positioning of the energy application tool which may be metal or otherwise affect the induction in the transformer, accelerometers, resistive pressure sensors, strain gauges, and/or any other appropriate type of sensor or combination of sensors. For example, an accelerometer within the device coupled with the energy application tool may measure signals corresponding to the resulting stress waves. Data transmitted by the accelerometer is processed by a calibrated computer program which detects changes in the properties of the specimen and quantifies objectively internal characteristics. In general, the sensing mechanism for detecting the characteristics of the effects of the energy application tool may be separate from sensing of the contact force between the handpiece (such as through the sleeve portion) with the object.

After impact with the object, the energy application tool, for example the tapping rod, decelerates, as noted above. The deceleration of the energy application tool, for example a tapping rod, may be measured by a measuring device or sensing mechanism, for example, an accelerometer inside the device. For example, the accelerometer within the device coupled with the energy application tool may be adapted for measuring the deceleration of the energy application tool upon impact with an object during operation, the percussion response from the object, measuring any vibration caused by the impact or measuring signals corresponding to the resulting stress waves. The measuring device or sensing mechanism may detect changes in the properties of the object and may quantify objectively its internal characteristics. Data transmitted by the measuring device or sensing mechanism may be processed by a system program, as noted before or below.

The above described measuring mechanism may also be applicable to other than mechanical energy application tools described above, with similar sensor set up, for example, when such energy application tools perform a percussion action.

In some embodiments, the inclinometer may include an accelerometer, such as a 3-axis device which measures gravity on all three axes, the X, Y and Z axes. In some embodiments of the invention, the device, such as a handpiece, may include software for measuring the value of the Y-axis (i.e. vertical) gravitational force (G-force). For example, if the G-force for the Y-axis is greater than about the plus/minus, say, 15 degrees threshold, the handpiece may make an audible noise, such as beeps, or a light signal such as a flashing light, or a light of a certain color. If the G-force for the Y-axis is greater than the 30-degree threshold, the handpiece may beep faster, or if a light signal such as a flashing light, it may be a faster flashing light. The accelerometer may be sampled every, say, 100 ms. Five consecutive valid readings may be needed (500 ms) to trigger a threshold and thus the beep or the flash, etc. The thresholds for both the 15 and 30-degree thresholds may be determined empirically.

For example, for a device without the features of the present invention, during operation, if the equivalent impact force is about 26 newtons at plus 15 degrees from the horizontal, the equivalent impact force may be about 32 newtons at a horizontal position, and at minus 15 degrees from the horizontal, the impact force may be about 35 newtons. With the present invention, all impact forces at all the above-mentioned angles may be at about 25 newtons or whatever optimal impact force is programmed.

As noted above, the system may be turned on and off with or without an external switch, or remote control. In some embodiments, the energy application process of the handpiece may be triggered via a mechanical mechanism, such as by a switch mechanism. In one aspect, a finger switch may be located at a convenient location on the handpiece for easy activation by the operator. In another aspect, the switch mechanism may be triggered by applied pressure to the object through the sleeve. In some other embodiments, the energy application process of the handpiece may be triggered via voice control or foot control.

Generally, any external switching device such as a flip switch, a rocking switch or a push button switch, may tend to restrict the manner an operator holds the instrument and thus may restrict the positioning of the instrument on the object, if it is handheld, for example, during measurement so as to enable easy access by the operator to the switching device for turning it on and/or off.

In some embodiments, to gain more flexibility in positioning the instrument, voice control or remote control may generally be used, though such voice controls or remote controls may add complexity to the system. In the present invention, the same advantages of flexibility may be gained without such remote controls or added complexities.

In some other embodiments, to gain more flexibility in positioning the instrument, activation of the device may be controlled by a proper contact force between the object and a sleeve portion located at the open end of the housing, as noted above and below. This proper contact force may also add other desirable features to the system, as discussed below. The sleeve portion may be open at its free end, with an object resting, pressing or contacting portion for resting on, pressing or contacting at least a portion of an object during measurement. The contact by the sleeve portion aids to stabilize the device on the object. During measurement, the force exerted by the sleeve portion on an object is controlled by an operator, unlike the impact force of the energy application tool, which may be controlled by the various factors of the system described above, and a proper contact force on the object may be important and may need to be monitored, since, for example, either insufficient or excessive force exerted by an operator may complicate the measurements, and may even produce less accurate results. A sensor disposed inside the housing, not physically or mechanically coupled to the energy application tool may be present to ensure that a proper contact force by the contacting portion of the sleeve portion may be applied by the operator for better reproducibility, even by different operators.

In some embodiments, the instrument may be instantaneously turned on once a proper contact force is exerted by the object contacting portion of the sleeve on the object, as indicated by visible or audible signals. In some other embodiments, there may be a delay prior to turning on the instrument once a proper contact force is exerted by the object contacting portion of the sleeve on the object, as indicated by visible or audible signals. In a further embodiment, once a certain push force between the object contacting portion of the sleeve portion and the object is detected and maintained for a period of time, for example, about 1 second, more for example, about 0.5 seconds, the instrument may be turned on to start measurement. In this embodiment, a green light lights up the tip, and percussion will begin approximately 1 second, more for example, 0.5 seconds after a force in the correct range is maintained.

The proper force exerted by the operator on the object, for example, through the sleeve portion, acts as a switch of the system. When the system is not switched on, it may be desirable to know whether it has malfunction, not sufficient force or too much force is exerted. In some embodiments, the force measurement may be connected to a visual output, such as lights. Lights may be mounted at any convenient location on the device or instrument, for example, one or multiple LEDs may be mounted at the front of the device or instrument. In one aspect, a multiple light system may be included. For example, two LEDs may be used. When the force is in the correct range, the green light may be lit. If too much force is detected, the LEDs may change to red, and the instrument will not work unless the push force is reduced. In some embodiments, if the user is pushing too hard on the object, the light may change first to amber, then to red. If the push force is sufficient to change the light to red, percussion may either not be started, or be interrupted if it has already started. In addition, there may be an amber LED state which warns when the user is approaching too much push force. At that stage, the instrument may still operate when the LEDs are lit amber. In another aspect, no light may indicate too little force, a green light may indicate the right amount of force, while a red light may indicate too much force. In yet another aspect, a one light system may be included. For example, no light may give a signal of too little force and a red light may give a signal of too much force. In a further aspect, a flashing red light may indicate too much force and no light may indicate too little force.

In some other embodiments, the force measurement may be connected to an audible output. In one aspect, the audible output may include a beeping sound to indicate too little force and a multiple beep to indicate too much force. In another aspect, the audible output may include a beeping sound to indicate too little force and a beeping sound with a flashing red light to indicate too much force. In a further aspect, the force measurement may be connected to a voice alert system for alerting too much force or too little force. In yet a further aspect, the force measurement may be connected to a voice alert system to alert too little force and a voice alert and a flashing red light for alerting too much force.

During measurement, as noted above, the system may measure, for a time interval, a percussive response such as energy reflected from the object as a result of the energy application, for example, by tapping or applying energy, or the deceleration information of the energy application tool, namely energy return. The response may be fed to a computer and the information is recorded or compiled for analysis by the system, which may include creating a percussive response profile, for example, an energy return curve or energy return graph (ERG) as a time-energy profile, or frequency-energy profile, based on the energy reflected from the object during the time interval, and/or evaluating the percussive response profile, for example, a time-energy profile, to determine the structural characteristics of the object, for example, vibration damping capacities; acoustic damping capacities; defects including inherent defects in, for example, the bone or the material that made up the object; cracks, micro-cracks, fractures, microfractures; loss of cement seal; cement failure; bond failure; microleakage; lesions; decay; structural integrity in general or structural stability in general.

Loss coefficient in general is an indication of the overall ability in damping capability in the object or structure being tested. In the percussion process, it is based on the maximum energy return or percussion force squared that are measured with the measuring or sensing mechanism coupled to the energy application tool, for example, the percussion rod, as discussed above and below. The normal fit error (NFE) or damage or instability, is the overall error (difference) between an ideal curve (generated by a defect free object) and the actual test data. These results may be calculated from the ERG. All response curves are normalized to a maximum of one prior to determining NFE and thus it is not directly related to loss coefficient.

As mentioned above, the system and method of the present invention is non-destructive and non-invasive, and may include a device capable of operating by holding the device at varying angles from the horizontal and modulating the energy application process to mimic a substantially horizontal position during measurement. The system may or may not include disposable parts and/or features for aiding in repositionability. The present system and method for measuring structural characteristics may minimize impact, even minute impact on the object undergoing measurement, without compromising the sensitivity of the measurement or operation of the system. When the energy application tool is a tapping rod, the amount of impact energy may also vary dependent on, for example, the length of the rod, the diameter of the rod, the weight of the rod or the velocity of the rod prior to impact, so on. In some embodiments, the system includes an energy application tool that is light weight and/or capable of moving at a slower velocity such that it minimizes the force of impact on the object during measurement while exhibiting, maintaining or providing equivalent or better sensitivity of measurement. In one aspect, the energy application tool, for example, the tapping rod, may be made of lighter material to minimize the weight of the handpiece and thus may minimize impact on the object undergoing measurement. In some other embodiments, the energy application tool, for example, the tapping rod, may be made shorter and/or of smaller diameter such that the size of the handpiece may also be minimized and thus may minimize impact on the object undergoing measurement. In a further embodiment, the system may include a drive mechanism that may lessen the acceleration of the energy application tool and thus may minimize impact on the object undergoing measurement. For example, the drive mechanism may include a separate drive coil to lessen the acceleration of the energy application tool, whether or not it is light weight, and/or smaller in length or diameter, and minimizes the impact force on the object during operation while maintaining sensitivity of measurement. These embodiments may be combined with one or more of the embodiments described before or below, including the lighter weight handpiece housing. The speed of conducting measurement may also be desirable without increasing the initial velocity of impact so as to minimize impact on the object during measurement. The system may or may not have disposable parts and/or features for aiding in repositionability mentioned above or below.

The system may include a drive mechanism that may vary the travel distance of the energy application tool, while maintaining an initial velocity of impact of the object by the energy application tool. For example, when the energy application tool includes a tapping tool, the distance may vary between a range of about 2 mm to about 4 mm. The decrease of the travel distance of the energy application tool, for example, from about 4 mm to about 2 mm, while maintaining the same initial velocity at impact, or contact, may enable faster measurement without compromising the operation of the system. The system may or may not include the various exemplary embodiments described above or below. For example, the system may or may not have disposable parts and/or features for aiding in repositionability and/or lessening impact with features mentioned before or below.

For any of the exemplary embodiments above, a system and method for measuring structural characteristics using an energy application tool may also include disposable features for aiding in eliminating or minimizing contamination of the object undergoing the measurement through transfer from the system or cross-contamination from previous objects undergoing the measurements, without interfering with the measurement or the capability of the system. The instrument includes a housing having a hollow interior with an open end and an energy application tool, for example, a tapping rod, or impact rod mounted inside the housing for movement inside the housing. The system provides a non-destructive method of measurement with some contact with the object undergoing such measurement without the need for wiping or autoclaving of the energy application tool, and at the same time without disposing of the energy application tool and/or the housing and whatever may be housed inside the housing of the instrument.

The disposable feature may include a covering for covering or enveloping a part of the system that may come into proximity or contact with the object undergoing the measurement without interfering with the sensitivity, reproducibility, if desired, or general operation of the instrument to any substantial degree.

The disposable feature may include any of those described below or as disclosed in U.S. Pat. No. 9,869,606, or WO2011/160102A9, entitled "System and Method For Determining Structural Characteristics Of An Object", the contents of which is hereby incorporated by reference in its entirety.

The disposable feature may include a sleeve portion extending from and/or enveloping the open end of the housing. In one example, for a mechanical energy application tool, the sleeve portion includes a hollow interior and an open free end with an object resting or contacting portion for resting on, pressing or contacting an object during measurement at its open end. A feature such as a contact feature, which may or may not be movable, having a length and disposed towards the open end of the sleeve portion, and may include a closed end for substantially closing the off the free end of the sleeve portion. substantially closing off fits snuggly inside the sleeve portion, for example, by friction. The contact feature may be, for example, a short tubular section, or a ring and may include a closed end for substantially closing the off the free end of the sleeve portion. The contact feature may be positioned in between the tip of the energy application tool and the surface of the object undergoing measurement. The contact feature described above may include a membrane that may be attached or formed integrally, as described above and below, to form the closed end. The membrane may be thick or thin, as long as they are chosen to have a minimal effect on the operation of the energy application tool. For example, The closed end, whether it is closed by a membrane or other structure, it may possess some elasticity or be deformable, and may adjust itself to various surface configurations of an object undergoing measurement, so that close contact with the object may be achieved during impact.

The closed end may include a thin polymeric membrane, which may or may not be of the same material as the rest of the contact feature, or it may be a material having substantially the same properties as the rest of the contact feature. The polymer may include any polymeric material that is capable of being molded, cast or stretched into a thin membrane so that it does not substantially adversely affect the measurement. In some other embodiments, the closed end may include an insert molded metal foil membrane. The metal may be any metallic material that may be drawn, cast or molded into a thin membrane so that it does not substantially adversely affect the measurement. The membrane may also be formed to conform to the shape of the energy application tool, or vice versa, for optimal transfer of force/energy. In some embodiments, the membrane may be constructed from stainless steel foil or sheet, and may, for example, be stamped and/or molded. In other embodiments, the closed end may be integral to the contact feature. For example, the contact feature may be formed from a material which may be shaped into a tubular or ring structure with a closed end of a desired thickness, such as by stamping a metal (e.g. stainless steel, aluminum, copper, or other appropriate metal).

In addition, the sleeve portion, the contact feature and tab and/or the sleeve, the tab and the component, may be made of recyclable, compostable or biodegradable materials which are especially useful in those embodiments that are meant to be disposed of after one use.

The device itself may be tethered to an external power supply or be powered by an electrical source included inside the housing, such as, for example, a battery, a capacitor, a transducer, a solar cell, an external source and/or any other appropriate source.

The system and method may be applicable for testing various objects that are mechanical, as noted before. For a mechanical object, which may include, but not limited to polymeric composite structures including honeycombs or layered honeycombs or metallic composite structure; an airplane structure, an automobile, a ship, a bridge, a tunnel, a train, a building, industrial structures including, but not limited to power generation facilities, arch structures, or other similar physical structures, testing may also be carried out on stationary or a mobile object while moving. Thus, mechanical objects may also be undergoing testing when they are either stationary or moving, which may give particular insight into the object under actual working conditions. For moving objects, such as a train, the testing may be performed over many different spots. This may be performed using one energy application tool, over a plurality of spots on the object, to obtain an average condition of the object in general or be performed on the same spot using many separate tools or devices to obtain an average result on the same spot. For performing measurement on the same spot using many energy application tools, the devices or tools may be positioned, for example, in succession along the path of the moving object over a distance, for example, an array of tapping rod impacting the object, and by controlling the spacing between the tools or devices one may be able to match the speed of the moving object, for example a train, to the spacing of the application of energy on the same spot of the object for obtaining an average value for the spot. In this example, measurements may be performed under actual operating conditions. In some embodiments, the array of devices may be a line array, either vertical or horizontal arrays, or a curve array. In another aspect, the array may be arranged in a two-dimensional array, planar or curvilinear.

In embodiments where the object is large, measurement at different locations of the object, for example, impacting at a plurality of portions of the object may allow better evaluation of the structural properties that are better representations of the object.

In general, the structural characteristics as defined herein may include vibration damping capacities; acoustic damping capacities; defects including inherent defects in, for example, the bone or the material that made up the object; cracks, micro-cracks, fractures, microfractures; loss of cement seal; cement failure; bond failure; microleakage; lesions; decay; structural integrity in general or structural stability in general. For an anatomical object, such as a tooth structure, a natural tooth, a natural tooth that has a fracture due to wear or trauma, a natural tooth that has become at least partially abscessed, or a natural tooth that has undergone a bone augmentation procedure, a prosthetic dental implant structure, a dental structure, an orthopedic structure or an orthopedic implant, such characteristics may indicate the health of the object, or the health of the underlying foundation to which the object may be anchored or attached. The health of the object and/or the underlying foundation may also be correlated to densities or bone densities or a level of osseointegration; any defects, inherent or otherwise; or cracks, fractures, microfractures, microcracks; loss of cement seal; cement failure; bond failure; microleakage; lesion; or decay. For objects in general, for example, polymeric composite structures including honeycombs or layered honeycombs or metallic composite structure; an airplane structure, an automobile, a ship, a bridge, a building, industrial structures including, but not limited to power generation facilities, arch structures, or other similar physical structures; such measurements may also be correlated to any structural integrity, or structural stability, such as defects or cracks, even hairline fractures or microcracks and so on.

Additionally, changes in the structure of the tooth or any foundation a mechanical structure is attached or anchored to that reduce its ability to dissipate the mechanical energy associated with an impact force, and thus reduce overall structural stability of the, for example, tooth, may be detected by evaluation of the energy return data as compared to an ideal non-damaged sample. In addition, as noted above, the present invention also contributes to the accuracy of the location of detection of defects, cracks, micro-cracks, fractures, microfracture, leakage, lesions, loss of cement seal; microleakage; decay; structural integrity in cement failure; bond failure; general or structural stability in general.

In some embodiments, a device measurement may be supplemented by the user with additional findings, such as the results of an actual physical examination of the object. For example, when the object is a human tooth, additional clinical findings such as a radiograph or transillumination findings, or even results from a tooth extraction may be included. The accuracy of machine learning algorithms generally improves when additional data elements may be provided for each sampled device measurement. These additional findings are considered part of the device measurement record.

In the data collection component, a machine learning system may include a connection to at least one device for use in capturing the measurements performed on the object. In some embodiments, the connection allows device measurements to be saved directly in a digital form into the storage system of the machine learning system. In some other embodiments, device measurements may be performed and recorded manually via a data entry user interface of the machine learning system. In a preferred embodiment, the user is prompted to classify the object being measured against a single-level or multi-level ontology. An example is restoration type, e.g., crown (acrylic, cast dowl core, core build up, emax, gold, etc.), filling (amalgam, composite, etc.), inlay/onlay (acrylic composite, emax, gold, etc.), etc. The user interface may also test for self-consistency by, for example, disallowing classification of a tooth as being both an implant and having an amalgam filling at the same time.

As noted above, annotations and/or validations may be included in the Acquisition module. The measurements made by any of the embodiments of devices described above, may be collected along with annotations and/or validations by the same or different personnel and be included in the Acquisition module.

Alternately, the test results from the devices may be included in the Collection module, and annotations and/or validations by the same or different personnel may be included in a separate module (e.g., Annotation module).

In another aspect ("Annotation"), a system may include an annotation user interface for collecting annotations. These annotations may associate data records for physical objects such as teeth with a label naming a specific defect indication, such as "loss of cement seal", "oblique crack", etc. For each such annotation, the interface may allow at least one device measurement to be captured for at least one, for example, tooth of a single patient and for at least one clinical finding of the physical condition of the teeth to be inputted for the teeth. In other embodiments, the interface for collecting annotations may use a pictorial diagram of the object and other surrounding objects, for example, a depiction of a patient's lower and/or upper jaw. In some embodiments, the tooth measurement and annotation may be captured at the same time. In other embodiments, the annotation may be captured independently from (for example, at a later point in time relative to) any target device measurement.

In an exemplary embodiment, a user may enter an annotation by selecting one or more matching categories from a single-level or multi-level ontology, e.g., crack in restoration (crown, filling, etc.), crack between restoration and tooth (microleakage, open margins, decay, etc.), crack between tooth and bone (infection, orthodontic origin, trauma origin, etc.), enamel cracks, etc.

In some embodiments, the device measurements and/or annotations may be stored using a distributed computing environment, such as a cloud. Storage on, for example, a cloud may allow multiple annotations to be collected simultaneously and decrease the time for accumulating an annotation dataset in order to improve prediction accuracy. In some embodiments, device measurements and/or annotations may be collected on multiple instances of the system and consolidated onto one or more of those instances. In some embodiments, the device measurements and/or annotations entries may be encrypted.

In other embodiments, the device measurements and/or annotations may be associated with identifying, for example, patient or customer information, which may be stored in a separate part of the system. For ongoing clinical practice, it is normal for data collected from a patient to be marked as having come from that patient. However, for research purposes, device measurements and/or annotations may be useful even without knowing which object or patient they are associated with. Furthermore, it may be necessary to protect patient and/or end customer privacy, and segregating the information tying the device measurements and/or annotations from the measurements and/or annotations themselves may reduce the risk of a security breach. Also, the identifying patient and/or customer information may be managed by another system altogether, such as an electronic health record system or a customer relationship management system. In all of these scenarios, an opaque, meaningless identifier may be used to connect the patient/customer-identifiable part of the information to the measurements and/or annotations.

In still other embodiments, the device measurements and/or annotations may include provenance information, such as the name of the personnel collecting the measurements, the facility location, and the date/time of collection. In some embodiments, the device measurements and/or annotations augmented with the aforementioned provenance information may be further leveraged to detect patterns of systemic error, by comparing statistics from device measurements and/or annotations at least one specific location and/or for at least one specific operator and comparing them to for example a specified norm or to averages of these statistics gathered across all operators and/or locations. Systemic errors that may be detected this way may include, for example, defective probe devices, operators that require additional training, and misdiagnosed damage types.

In some embodiments, the device measurements and/or annotations augmented with the aforementioned provenance information and/or patient/customer information may be further leveraged to uncover insights on the population and geographic distribution, allowing relevant, preventive care, products, promotions, and/or services to be marketed. The information may be leveraged to find damage types that are more common in, for example, a given geographic area, for patients of a given gender, ethnicity, and/or for patients in a given age range. Patterns of ineffective care at a facility may also be uncovered by comparing changes in device measurements and/or annotations at the same location and/or for the same patients over time.

In some embodiments, specific users may only be given one or more specific privileges from a list of privileges including for example viewing raw device measurements, viewing other users' annotations, etc. Under some circumstances, such as for a clinical trial, it may be necessary to "blind" one set of users responsible for, for example, annotating a specific patient's ground truth records with clinical findings from for example raw device measurements collected from the same patient. The net effect is that a device measurement is being annotated with clinical findings, but the user entering the clinical findings may not be allowed to see the device measurement.

In some exemplary embodiments the system and method may include a machine and a number of components, for example, mechanisms for capturing annotations against test data captured by measurement devices. The test data may be from the same object, but tested at different times, or from different objects that may or may not be related to one another.

There are advantages of the present approach adopted by the present invention; some of these advantages are elaborated below. For example, two different styles of mathematical models may be applied in a unique way in concert to capture the patterns present in the measured data captured on the objects being studied, for example, teeth. Machine learning may be effective in predicting structural characteristics of objects when provided with limited input data, although effectiveness is limited by available training data. Training data may be augmented by data generated through simulation, generated by a second mathematical model that is calibrated using quantitative measurements. For another example, a specialized, integrated user interface may be provided to expert practitioners to accelerate the process of capturing annotations on raw device measurement data and to feed said data into the machine learning training cycle, so that predictions from the present invention may be improved in near real-time.

In another aspect ("Training"), a system trains at least one machine learning model to produce at least one transformation function using the data collected in the Acquisition aspect or Collection aspect and the annotations collected in the Acquisition aspect or Annotation aspect. In some exemplary embodiments, a combination of one or more of the device measurement data, ancillary data, simulated data, and annotations (the combination being referred to as "ground truth data"), may be utilized in training a machine learning model on the patterns that exist in device measurements, ancillary data, and/or simulated data, and the resulting transformation function may be used to predict the true condition of an object, for example, an anatomical object such as a human tooth. Applied repeatedly when new and/or updated ground truth data and/or annotations are introduced, the process may be capable of generating better and more accurate predictions.

The system and method may also additionally include a machine and a mechanism for building a physical simulation of at least one tooth configuration.

There are advantages of the present approach adopted by the present invention; some of these advantages are elaborated below. For example, two different styles of mathematical models may be applied in a unique way in concert to capture the patterns present in the measured data captured on the objects being studied, for example, teeth. Machine learning may be effective in predicting structural characteristics of objects when provided with limited input data, although effectiveness is limited by available ground truth data. In creating a ground truth data set, device measurement data may be augmented by data generated through simulation, generated by a second mathematical model that is calibrated using quantitative measurements. For another example, a specialized, integrated user interface may be provided to expert practitioners to accelerate the process of capturing annotations on raw device measurement data and to feed said data into the machine learning training cycle, so that predictions from the present invention may be improved in near real-time.

Machine learning techniques may include regression (e.g., logistic, linear), clustering (e.g., k-means), neural networks (e.g., deep learning), classifiers (e.g., support vector machine, decision tree, random forest), deep learning, etc. The base machine learning techniques utilized may themselves be standardized techniques, and not themselves unique; however, the present inventors have found certain unique adaptations to the types of data stored in a case file to make them useful to a machine learning algorithm. For example, percussive energy return graphs may be filtered and transformed into spectrograms for use in deep learning. Models may then be trained, versioned, and stored in a secure database running on a set of centralized cloud-based servers. Models may take the form of complex mathematical transformation functions that, when presented with a set of inputs for a new case file, may reveal one or more likely structural defect types as output. The primary users of this aspect of the invention are data scientists and software engineers that perform maintenance on the system.

In some embodiments, at least one machine learning algorithm may be configured to train a computer and construct at least one transformation function to predict the physical condition of at least one object, such as a tooth, using a dataset composed of device measurements and the associated annotations, which in combination may also be known as ground truth, or a subset thereof. The device measurement may include the ERGs, the loss coefficients, the NFEs or a combination of loss coefficient or mobility and normal fit error (NFE) or damage or stability based on the ERG versus time curve shape. The feature vector used by the machine learning algorithms may be constructed for each object, for example, a tooth based on one or more elements present in the device measurement and in zero or more associated annotations, e.g., clinical findings, ontological classifications such as defect type and/or tooth geometry, etc. The labels to be predicted by the machine learning algorithms may include specific physical conditions in specific regions of the physical object, for example, a tooth, or regions relative to some physical characteristic, for example, a tooth crack. The labels may also include measures such as a severity level of the condition and an estimate of remaining lifespan.

In some embodiments, the feature vector may include the raw ERG data point series.

In some embodiments, the ground truth dataset may be transformed mathematically before being incorporated into the feature vector in order to make it easier to apply a machine learning algorithm and/or remove possibly erroneous data and/or noise. In some embodiments, the feature vector may include a version of the ERG transformed via for example Fast Fourier Transform, wavelets, and/or a power spectral density. In some embodiments, the feature vector may include a version of the ERG transformed into a time-frequency domain using for example Wigner-Ville, Pseudo Wigner-Ville, and/or Margenau-Hill Distribution. In some exemplary embodiments, multiple transformed ERGs may be stacked in separate color channels.

In some embodiments, the feature vector may include the quantity, height, and location of peaks and/or troughs in any domain (time, frequency, etc.). In some embodiments, the feature vector may include the distance between peaks/troughs and/or the prominence of peaks/troughs, or any combination thereof. In some embodiments, the feature vector may include full-width, half-max of peaks.

In some embodiments, the feature vector may include expert observations of existing small gap discontinuities and/or the shape, location, type, and orientation of the discontinuities.

In some other embodiments of the invention, the device measurement data in the ground truth dataset may be run through a filter to remove extraordinarily high or extraordinarily low frequency components of the data that might originate from noise.

In some embodiments, ground truth data may be fit against a parameterized family of ideal curve functions. In doing the fitting, a set of parameters that are a best match for a member of the function family and/or an error value representing the deviation between the actual ground truth data's waveform and the best-match ideal curve function are calculated. These parameters and/or an error value may be used in the feature vector.

In some embodiments, the ideal curve functions may be designed to include at least one intentional defect, for example, a small gap discontinuity. The error value in this case can indicate a deviation from the at least one intentional defect, for example, a small gap discontinuity, indicating either a smaller/nonexistent gap or a larger gap being present.

In an exemplary embodiment, the ideal curve functions are those from a solid with small gap structural discontinuities (cracks, narrow gaps, openings, etc.), which will not be bell shaped. Deviations from the ideal curve functions may indicate a difference in the shape, size, and/or orientation of the discontinuity. For instance, the gap in a measured object may be bigger than the one built into the ideal curve functions.

In some exemplary embodiments, the parameterized family of ideal curve functions is the set of equations described below. In general, when a percussion device is used, the Normal Fit Error (NFE) may be determined as follows:

The Defect Severity Quotient (DSQ) is equal to NFE× 1000.

The Damage (D) is given by D=27×ln(DSQ)−61, where ln is the natural logarithm.

As noted above, the force may be determined by a sensor coupled to the energy application tool. The energy return data generated in a test is normalized before fitting to these data is performed. In other words, for an energy application tool that is a tapping rod, the equation to be fitted is for $E_r/E_{rmax}$ instead of just the energy return, $E_r$, which characterizes the elastic energy of this force measurement. For example, $E_r$ is defined as $E_r=F^2/2K$, where F is the resultant percussion force and K is the stiffness of the energy application tool, for example, the tapping rod assembly. The normalized energy return, variation with tie for a defect-free calibration sample could be expressed in the form:

$$\overline{E}_r = \beta\sin^2(\gamma t)\exp\left[-\frac{(t-\phi)^2}{\psi}\right]$$

where t is time and $\beta$, $\gamma$, $\phi$, and $\psi$ are parameters that are determined via a nonlinear regression fit to measured data. The NFE is equal to the cumulative error between the normalized measured data and a nonlinear regression fit of the equation above to the normalized measured data. Thus, the NFE represents that overall difference between the shape of an ideal energy return response for a defect-free sample and that for the measured data.

In some exemplary embodiments, the Normal Fit Error (NFE) may be used for the error value. In other embodiments, an error value may be calculated using standard distance metrics, for example, Euclidean distance, variance, standard deviation, standard error, max error, root mean square error, etc.

In general, the loss coefficient may be derived from damping characteristics of an object, for example, tooth and implant. After application of kinetic energy to the object, the relative extent to which the object deforms inelastically and dampens elastic energy may be characterized as its loss coefficient, given by $\eta=D/2\pi U$, where D is the total energy dissipated (or lost) per unit volume and U is the elastic energy per unit volume. The stability index (SI) is equal to $Fp^2/Fc^2\times 100$, where Fp is the maximum percussion force measured by the sensor in the percussion rod for the sample tested and Fc is the maximum percussion force for a stiff calibration sample (e.g. aluminum alloy or stainless-steel block). Other calibration materials may also be used. The Mobility is equal to 100−SI. In some embodiments, the feature vector may include the loss coefficient, the stability index, and/or values derived thereof.

In some embodiments, an unsupervised machine learning algorithm, such as for example k-means clustering, may be used to generate clusters of device measurements, and the transformation function may be constructed to first find the cluster with the best match to the inputted object such as a tooth and then to return at least one clinical finding that is prominent within that cluster according to the ground truth dataset.

In some other embodiments, a supervised machine learning algorithm, such as for example a support vector machine or a neural network, may be used to generate a transformation function directly from a ground truth dataset.

In some exemplary embodiments, the neural network is a convolutional neural network (CNN) based on a design used commonly for recognizing two-dimensional images of objects such as, for example, animals and plants found in nature. The feature vector in this case uses a time-frequency domain transformed or other two-dimensional rendition of the energy return graph. In some exemplary embodiments, transfer learning is applied to the convolutional neural network, thereby leveraging technology and computational resources that are otherwise intended for two-dimensional image recognition for one-dimensional signal data. In some embodiments, the feature vector incorporates discrete quantities such as the parameters identified for the best fit ideal signal shape function. In some embodiments, the two approaches above are combined, by encoding the discrete quantity features in image form to be incorporated into the two-dimensional image.

In a further embodiment, a supervised machine learning algorithm, such as for example a support vector machine or a neural network, may be applied to the ground truth clusters derived from an unsupervised machine learning algorithm, such as for example k-means clustering. The resulting transformation function works as follows. Once an inputted object is matched to a cluster, the supervised machine learning algorithm is then applied to further predict which, if any, of the labels apply to the object.

In some other embodiments, a decision tree model is calculated using a machine learning algorithm.

The predictive model may also include information collected from other tests not generated by the Device described above. For example, for an anatomical object, other tests results may include computer modeling, radiography, transillumination, disassembling, or even examinations after extraction, or combinations thereof.

In some embodiments, the training cycle may be run on a fixed schedule. In some other embodiments, the training cycle may be run upon the triggering of at least one event, such as the addition of an additional ground truth dataset entry. As the predictive capabilities of the machine learning system are improved as transformation functions are improved during a training cycle, it is useful to schedule the training cycle to occur frequently so as to ensure that transformation functions incorporate all available device measurements and/or annotations.

In some embodiments, at least one transformation function resulting from at least one training cycle may be managed directly by an end user. As transformation functions may evolve over time as a result of the introduction of either elucidating or, potentially, erroneous ground truth dataset entries, it is useful for versions of the transformation functions to be dated, labeled, and/or flagged according to their usefulness.

In some embodiments, a review process may be supported to allow a transformation function to be inspected by at least one user and/or tested by at least one validation methodology before said transformation function is considered to be usable.

The present invention may also include a simulation model component. For example, a machine learning system may include at least one physical simulation model for at least one object configuration, for example, one tooth configuration. The physical simulation model, for example, for a tooth, may be useful for simulating how at least one clinical finding may impact device measurements. In some embodiments, the physical simulation model may use an analysis, namely finite element analysis, to perform the simulation. In some other embodiments, the default parameters for a physical simulation model, such as one based on finite element analysis, may be provided by a user. The process for establishing an initial physical simulation model may involve measurements and mathematical systems. The machine learning system may be set up to both leverage the model as described by these externally-provided parameters for generating simulated device measurements as well as to incrementally improve the parameters to the model as a result of device measurements and/or annotations collected by the machine learning system.

In some embodiments, a ground truth dataset may be created or augmented by entries generated via at least one physical simulation model. The physical simulation model generates values that may be interpreted with nominal post-processing as device measurements relevant for teeth with the clinical findings the model was configured to simulate. For example, when a percussion system is used, potential post-processing may include extracting the response experienced by the energy application tool, for example, the percussive rod as a function of time. These values plus the physical simulation model's target clinical findings comprise viable entries of a ground truth dataset. The aforementioned feature vector construction methods would then also apply to simulation-produced ground truth dataset entries.

In some embodiments, the parameters of at least one physical simulation model may be updated in response to at least one ground truth dataset entry to better conform to the device measurements. Physical simulation models may be defined with equations with embedded coefficients and other constant parameters that relate physical quantities such as position of various defects to one another. These parameters may include, for example, the Young's modulus of materials; damping parameters of materials; contact surface design of the materials; boundary conditions such as for example how the bone is fixed in the model; initial conditions such as for example percussion rod velocity and/or percussion rod angle. For a new structural characteristic for an object such as a tooth or a previously-modeled structural characteristics, when device measurements, when plugged into the physical simulation equations, have a mismatch that exceed a specified tolerance threshold, coefficients and/or constant parameters may be adjusted so as to bring the mismatch back within the tolerance threshold. Device measurements and/or ancillary information such as imaging may also be used to improve the design of modeled physical objects such as for example cracks, to better match with the defects observed in, for example, teeth; the geometry of the tooth; PDL (periodontal ligament) thicknesses; separation distance between the percussion rod tip and enamel; contact location of the percussion rod tip on enamel; shape and/or location and/or separation between the surfaces of a crack; percussion rod shape and/or weight and/or velocity; boundary conditions such as for example how the bone is fixed and/or in which directions may the percussion rod move; finite element mesh size and/or type; definition of contact between surfaces of each tooth part as well as crack surfaces; material (Enamel, Dentin, PDL, Bone, Steel) elastic properties; passion ratio; density; damping properties of materials; and/or constitutive material models such as for example Linear Elastic, Marlow (Piecewise Elastic), and/or Hyperelastic.

In some exemplary embodiments, transformation functions may be trained to detect deviation from an ideal structural condition in solid objects with small gap discontinuities and/or defects such as electronic parts, oil and gas pipes, airplane parts, structures, etc. In this case, annotations entered via the Annotation module may include descriptions of pre-existing conditions, corrective actions taken, etc. Physical simulation models using for example Finite Element Analysis can be used to predict one or more aforementioned feature vector components such as ERG, loss coefficient, etc. for various defect conditions of said solid objects. The simulation-generated feature vectors are then used to train a machine learning model and produce one or more transformation functions. The resulting transformation functions may then be able to predict one or more characteristics such as location, orientation, and type of defect, depending on the diversity of the characteristics simulated in the physical simulation model.

In some embodiments, the ground truth dataset may be augmented for use in training by perturbed versions of at least one existing ground truth dataset. Perturbations may include, for example, adding random noise and stretching or compressing waveform data in the time and/or amplitude domains, so as to create variations in the dataset that mimic the slight variations found within a diverse set of, for example, human teeth.

In another aspect ("Prediction"), a system applies transformation functions to predict one or more structural defect classifications.

In some exemplary embodiments, the transformation function used for prediction is chosen from the transformation functions generated in the Training aspect.

In some embodiments, a predefined, canonical transformation function may be included and used to perform predictions. In some exemplary embodiments, the transformation function used may be based on a standardized predictive model. As mentioned above, each test may generate one profile and the profile generated may be complicated. Time and energy are spent also to validate the interpretation of the test results using other methods, such as radiographs, transillumination and if the profiles predict serious defects, more destructive methods such as disassembly or even extraction in terminal situations. The present inventors have found a way to compile validated test information from the profiles into a predictive model for predicting whether defects or abnormalities may or may not be present in any object that may or may not have not been tested, using a combination of not more than the two relevant factors noted above. Thus, instead of having to go through complicated annotation and/or validation steps, which may or may not correctly validate the test, each time a test is performed, only two factors from the percussion test results need be generated for the model to predict the absence or presence of a defect, or locate a defect and recommend a rehabilitation procedure. The model created using validated results may generate a form of decision tree that may be used to predict the structural characteristics of an object with a simple non-invasive percussion test, without having to perform the actual validation testing, which may be complicated, in addition to being sometimes invasive and/or destructive.

In some exemplary embodiments, the transformation function is a function that compares the Normal Fit Error (NFE) and/or Loss Coefficient to one or more predetermined cut-off values to determine defect severity. The combination of relevant factors involved in the present invention include loss coefficient or mobility and NFE or damage or stability based on the ERG versus time curve shape. Loss coefficient in general is an indication of the overall ability in damping capability in the object or structure being tested. In the percussion process, it is based on the maximum energy return or percussion force squared that are measured with the measuring or sensing mechanism coupled to the energy application tool, for example, the percussion rod, as discussed below. The Normal Fit Error (NFE) or damage or instability, is the overall error (difference) between an ideal curve (generated by a defect free object) and the actual test data. The inventors have found that the severity of structural pathology, for example, damage, increases as this error increases. All response curves are normalized to a maximum of one prior to determining NFE and thus it is not directly related to loss coefficient.

For an anatomical object, the structural characteristics of, such as a tooth structure, a natural tooth, a natural tooth that has a fracture due to wear or trauma, a natural tooth that has become at least partially abscessed, or a natural tooth that has undergone bone loss or a bone augmentation procedure, a prosthetic dental implant structure, a dental structure, an orthopedic structure or an orthopedic implant, such characteristics may indicate the health of the object, or the health of the underlying foundation to which the object may be anchored or attached may be tested to generate a loss coefficient and an NFE factor. The test results may be related to the health of the object and/or the underlying foundation. The health of the object or foundation may also be correlated to densities or bone densities or a level of osseointegration; any defects, inherent or otherwise; or cracks, fractures, microfractures, microcracks; loss of cement seal; cement failure; bond failure; microleakage; lesion; or decay that may have weakened the structure in a way that creates micro movement within the structure. For objects in general, for example, polymeric composite structures including honeycombs or layered honeycombs or metallic composite structures; planes, automobiles, ships, bridges, buildings, industrial structures including, but not limited to power generation facilities, arch structures, or other similar physical structures; such measurements may also be correlated to any structural integrity, or structural stability, such as defects or cracks, even hairline fractures or microcracks, and so on.

In the prediction interface component, a user interface may be included for allowing at least one object, for example, one patient's device measurements to be captured for at least one tooth. For a given patient or end customer, at least one feature vector may be created based on said device measurements and/or additional clinical findings. The production interface may use at least one transformation function on said feature vector(s) to predict at least one of the labels listed above for at least one object, for example, at least one tooth, for at least, for example, one patient. The interface may also display derived information such as an approximate remaining lifespan for the object and proposed corrective actions.

In some embodiments, the production interface may interface with another system, such as a laboratory information management system or an electronic health record system, in order to provide a place to store the physical condition predictions generated by at least one generation function of at least for example one tooth for at least for example one patient and/or to automatically retrieve additional clinical findings needed to construct said feature vectors.

In some embodiments, the validity of a predicted physical condition for at least for example one tooth may be recorded by an expert user. In some embodiments, the prediction and other data associated with for example said tooth/teeth may be added into at least one ground truth dataset.

The system and method of any of the above embodiments may also be useful in predicting a future course of action for the object having a certain predicted structural characteristic. The future course of action may include continuing monitoring, or further testing. As the predicted structural characteristics may vary with different test objects, so would any predictive course of action.

As used herein, the word patient includes not just a living being, but also non-anatomical structures such as bridges, airplane, etc., whose physical components may be examined.

Further, the predictive model may also be useful in aiding in determining proper measures for further testing, proper corrective measures to continue monitoring and/or restore the object to substantially issue free stage. In addition, the predictive model may in some instances provide more insight into the structural characteristics than using the test results of the object alone.

The present invention further relates to a computerized system and method for automatically determining structural characteristics of an object in a non-invasive manner and/or a non-destructive manner after an operator performs the test using any of the systems described below. The computer system may be implemented with programs to automatically determine the relevant factors and comparing the data with the predictive model to arrive at the measured structural characteristics of the object.

The above predictive model and test procedure used to generate results may be loaded into a test device equipped with the features of the device above so that the test device may automatically instruct an operator to test a new object and after the test procedure is carried out, to automatically generate a transformation function as noted above, and using the generated transformation function to predict at least one structural characteristic of the new object without further operator participation.

The present invention together with the above and other advantages may best be understood in conjunction with the following detailed description of the aspects, embodiments and examples of the invention and as illustrated in the drawings. The following description, while indicating various aspects, embodiments and examples of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

FIG. 3b illustrates a cross-sectional view of a tapping rod within the handpiece of FIG. 3a;

DETAILED DESCRIPTION OF THE INVENTION

Figure 1:
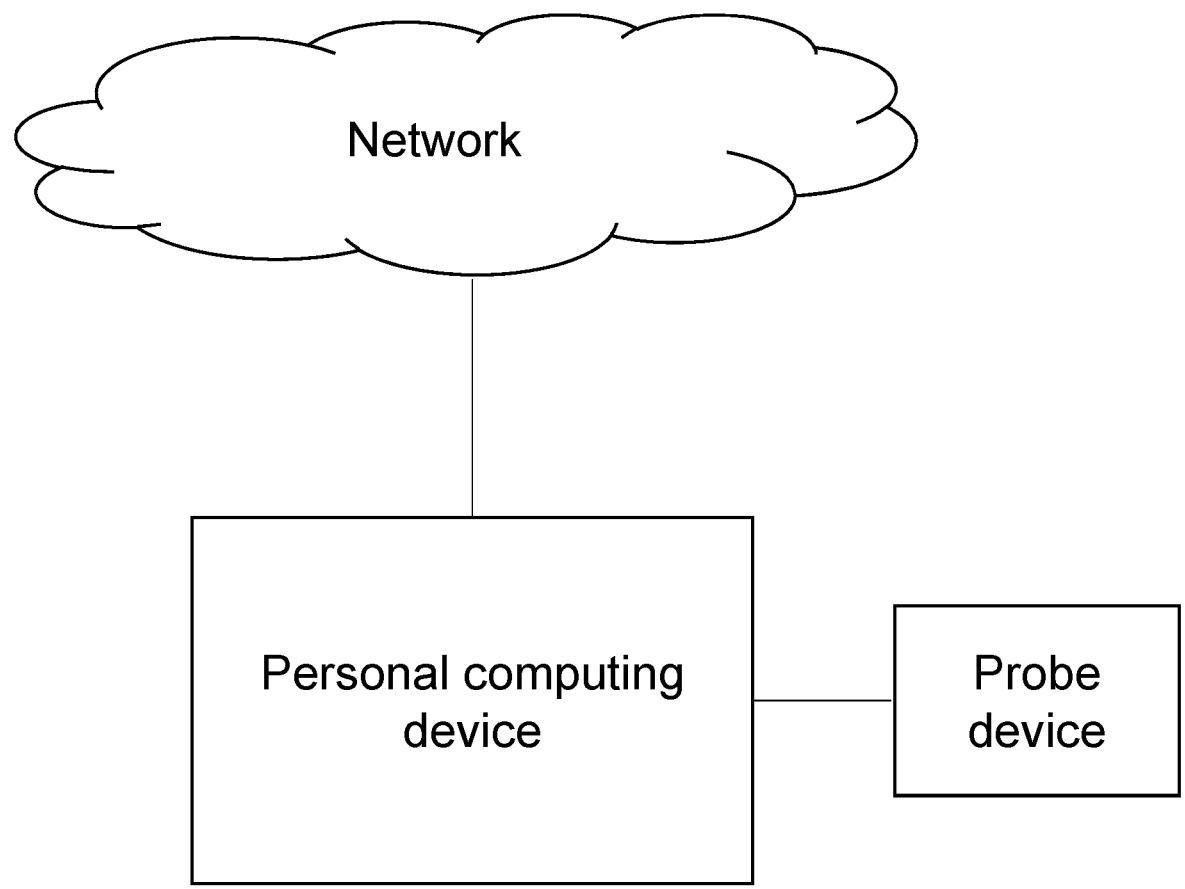
FIG. 1 illustrates the connection of an endpoint device with computing device and a network.

The detailed description set forth below is intended as a description of some of the exemplified systems, devices and methods provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any systems, methods, devices and materials similar or equivalent to those described herein may be used in the practice or testing of the invention, some of the exemplified systems, methods, devices and materials are now described.

All publications mentioned herein are incorporated herein by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In general, the system may include the following aspects and/or a sub-combination thereof, which are discussed additionally above: an aspect including a first program logic module ("Acquisition") that includes the functions for collecting device measurements of physical objects (a "Collection" aspect), which may be anatomical or non-anatomical; and accepting, from a user, expert annotations on device measurements regarding the structural characteristics of the measured physical objects (an "Annotation" aspect); another aspect including a program logic module ("Training") executing a training cycle for training a machine learning algorithm on a ground truth dataset including stored device measurements and/or expert annotations to create a transformation function; and a further aspect including a program logic module ("Prediction") exposing a production interface for performing predictions on the device measurements utilizing the transformation function. In general, structural characteristics may include, but are not limited to, the presence or absence of a physical characteristic, trait or property, and/or an indication of a degree, level or severity of such (e.g. a discrete, metered or arbitrary indication such as low, medium, high or the like).

In the aspect termed as Collection, which may form part of the Acquisition aspect, the present invention relates to a system for compiling test results from a multitude of objects which may or may not include test results of an object tested over a period of time. In some embodiments, each of the test results may be generated using an instrument or device designed and/or adapted for collecting test results or data, such as an endpoint device.

FIG. 1 illustrates an embodiment of the architecture of an endpoint device, for example, for a dental measurement. Endpoint devices may generally be located in, for example, dentists' offices or other locations where measurements may be taken on object (e.g. teeth, implants, etc.) of patients. An endpoint device may generally include or be connected to a personal computing device such as a PC workstation, a laptop, a tablet, or some other general computing device that may connect to a larger network such as the Internet or a private network. At least one device may be attached to the endpoint device, either via a wired data transmission technology such as for example USB or FireWire or via a wireless data transmission technology such as Bluetooth.

Figure 2:
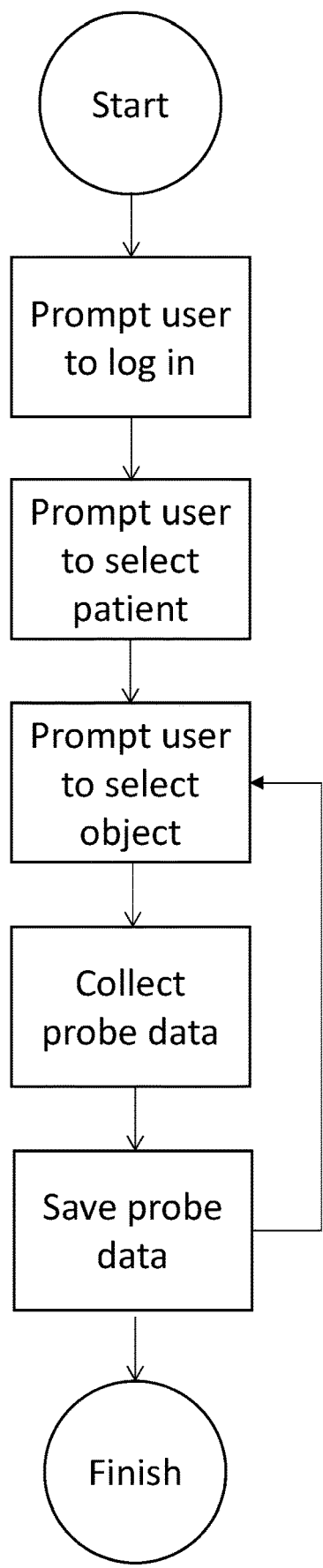
FIG. 2 illustrates the operation of an endpoint device by an operator.

FIG. 2 illustrates an embodiment of the operation of the endpoint device by a user, such as technician. First, the endpoint device presents a login screen to the technician, in order to establish his/her identity, and this identity is checked via a call to the central server. The endpoint device then presents a user interface for creating and/or searching for a record corresponding to the patient being examined. The endpoint device then presents a screen showing the physical objects, for example teeth, to be annotated. The physical objects may be laid out in a graphical form, such as in the shape of a jaw, in order to more easily navigate to one specific object based on its anatomical location relative to other objects. The endpoint device prompts the technician to choose one of these physical objects, for example a tooth, and the connected device may then be placed over the corresponding tooth on the patient. The connected device captures measurement data, and the endpoint device saves this measurement data to the endpoint device's storage and/or the central server. This process may then be repeated until all teeth whose data is to be captured have been examined.

Figure 3:
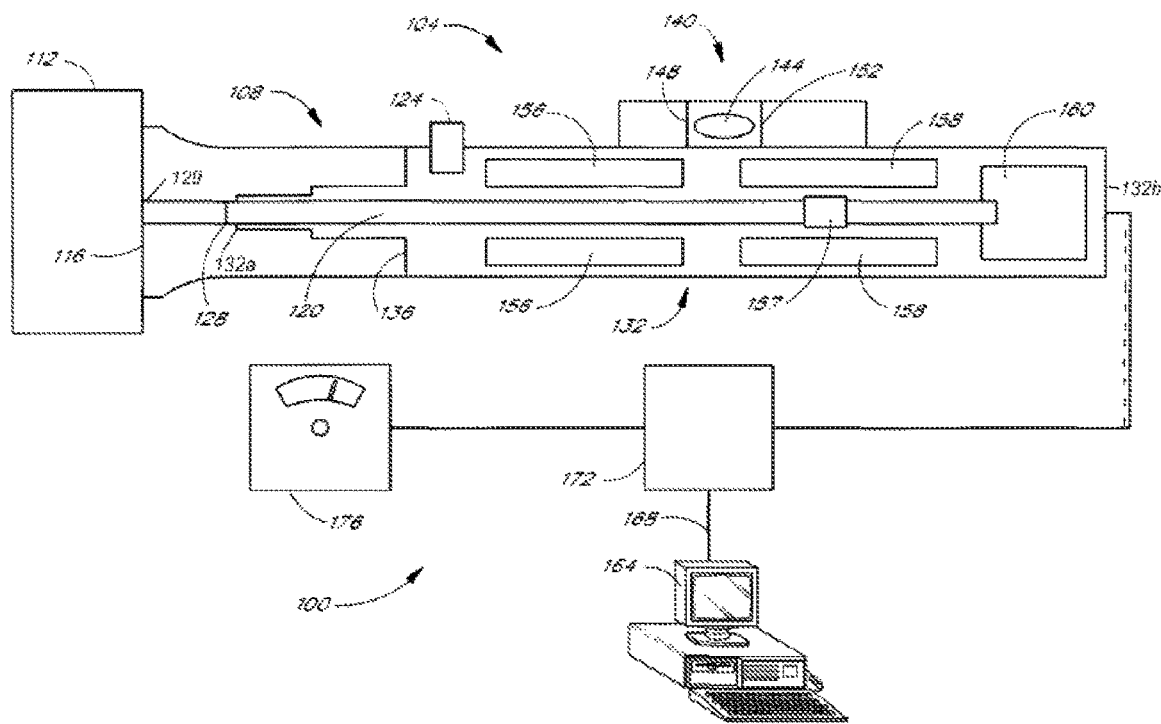
FIG. 3 illustrates a block diagram of a measurement device of the present invention.

The device suitable for use in testing the object may include may include housing having a longitudinal axis, with an open end and an energy application tool, for example, a tapping rod, or impact rod mounted inside the housing for axial movement along the longitudinal axis of the housing, as shown in FIG. 3 which shows an embodiment of the device discussed above. In some embodiments, the system may include a handpiece 104, in the form of a percussion instrument. The handpiece 104 may have a cylindrical housing 132 with an open end 132a and a closed end 132b. The open end 132a is tapered as exemplified here, though other configurations are also contemplated. An energy application tool 120, for example, a tapping rod 120, may be mounted inside the housing 132 for axial movement, as noted above. The handpiece also includes a drive mechanism 160, mounted inside the housing 132 for driving the tapping rod 120 axially within the housing 132 between a retracted position 128 and an extended position 129 during operation. In the extended position 129, the free end of the tapping rod 120 extends or protrudes from the open end 132a of the housing 132, as shown. The drive mechanism 160 may include an electromagnetic coil 156, to be discussed further below. The tapping rod 120 may have a permanent magnetic ensemble 157 mounted at the end away from the free end. The electromagnetic coil 156 of the drive mechanism 160 may be situated behind the other end of the tapping rod 120, resulting in a relatively small outside diameter for the handpiece 104.

Figure 3A:
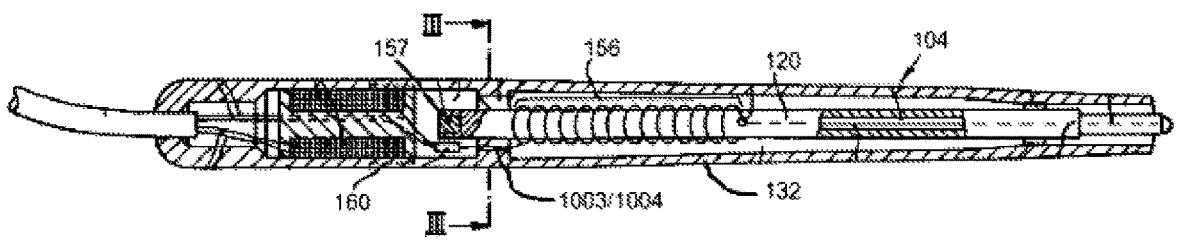
FIG. 3a illustrates a cross-sectional view of a handpiece showing the internals of the present invention.
Figure 3B:

The mounting mechanism for the energy application tool 120, for example, tapping rod 120 may be formed by bearings 1003 and 1004, as shown in FIG. 3b, for receiving or supporting the tapping rod 120 in a largely friction-free manner. The magnetic or propulsion coil 156 may be situated in the housing 132 adjacent to the permanent magnet 157 and is axially behind the permanent magnet 157. The magnetic coil 156 and the permanent magnet 157 form a drive for the forward and return motion of the tapping rod 120. The drive coil 156 may be an integral component of the housing 130 and may be connected to a supply hose or line 1000.

The two bearings 1003 and 1004 may be substantially frictionless and may include, as shown in FIG. 3b, a plurality of radially inwardly extending ridges separated by axial openings 1400. The axial openings 1400 of the bearing 1003 allow the movement of air between a chamber 1500 which is separated by the bearing 1003 from a chamber 1600, which chambers are formed between an inner wall surface of the housing 132 and the tapping rod 120. Air movement between these chambers 1500 and 1600 may thus compensate for movement of the tapping rod 120.

Figure 17:
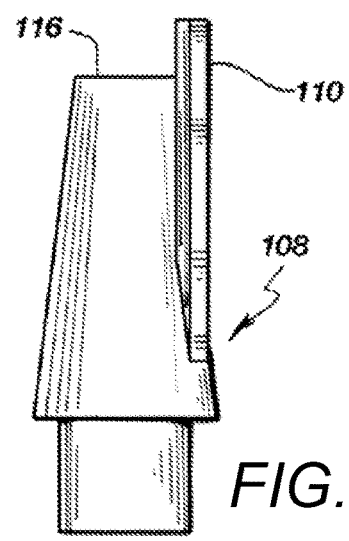
FIG. 17 illustrates an embodiment of a sleeve portion for the measurement devices of the present invention.

Referring again to FIG. 3, a sleeve 108 is positioned towards the end 132a and extending beyond it. The sleeve 108 envelops the end of the housing 132a and is flattened at its end 116 for ease of positioning against a surface of an object 112 during operation. The sleeve aids in the positioning of the handpiece 104 on the object to stabilize the handpiece during operation. The sleeve 108 may also include a tab 110, as shown in FIG. 17, protruding from a portion of its end 116, so that when the open end 116 of the sleeve 108 is in contact with a surface of the object 112 undergoing the measurement, the tab 110 may be resting on a portion of the top of the object 112, as shown in the FIG. 3b. The tab 110 and the sleeve 108 both assist in the stabilizing and repeatable positioning of the handpiece 104 with respect to the object 112 and the tab 110 may be placed substantially at the same distance from the top of the object 112 every time. As noted above, the object may include an anatomical structure or a physical structure.

Figure 18:
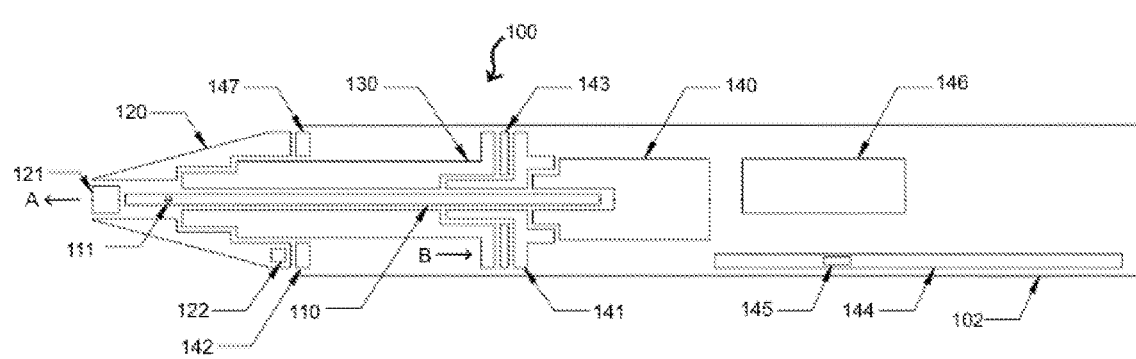
FIGS. 18, 18a, 18b and 18c illustrate block diagrams of measurement devices of the present invention.

FIG. 18 depicts embodiments of other devices that are applicable for the present invention. The system may include a handpiece 100 having a housing 102 which houses the energy application tool and sensing mechanism, as illustrated in the block diagram of FIG. 18. In general, a handpiece may refer to a handheld device, but may also include, without limitation, any other appropriate form for the desired application, such as mounted devices or tool/mechanically/robotically articulated devices. The handpiece 100 may also be referred to, for example, as a device or instrument interchangeably herein. In some embodiments, the energy application tool 110, as illustrated, may be mounted within the housing 102 for axial movement in the direction A toward an object, and such axial movement may be accomplished via a drive mechanism 140. Drive mechanism 140 may generally be a linear motor or actuator, such as an electromagnetic mechanism which may affect the axial position of the energy application tool 110, such as by producing a magnetic field which interacts with at least a portion of the energy application tool 110 to control its position, velocity and/or acceleration through magnetic interaction. For example, an electromagnetic coil disposed at least partially about the energy application 110 may be energized to propel the energy application tool 110 forward toward the object to be measured, as illustrated with the electromagnetic coil 140. The electromagnetic coil may also, for example, be alternatively energized to propel the energy application tool 110 backward to prepare for a subsequent impact. Other elements, such as rebound magnetic elements, may also be included, such as to aid in repositioning of the energy application tool 110 after propelling via the electromagnetic coil. The drive mechanism 140 and/or other portions of the instrument may generally be powered by a power source, as shown with power source 146, which may be a battery, capacitor, solar cell, transducer, connection to an external power source and/or any appropriate combination. An external connection to a power source, either to power the handpiece 100 or to charge the internal power source, such as the power source 146, may be provided, such as a power interface 147 in FIG. 18, which may include, for example, a power contact for direct conductive charging, or the power interface 147 may utilize wireless charging, such as inductive charging.

Figure 18A:
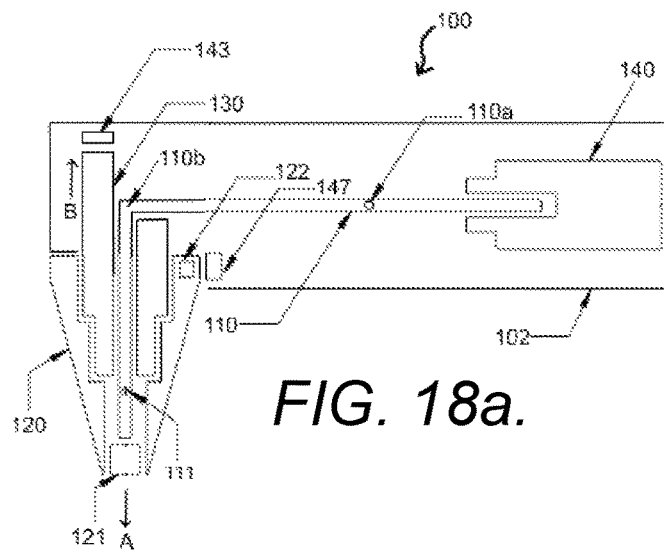

In some other embodiments, the energy application tool 110 may be utilized to move substantially in a direction A which may be perpendicular or substantially perpendicular to the longitudinal axis of the housing 102, as illustrated in the block diagram of a handpiece 100 in FIG. 18a. As illustrated, the energy application tool 110 may, for example, be substantially L-shaped to accommodate the interaction with the drive mechanism 140 and protrude in direction A, substantially perpendicular to the axis of the housing 102. As illustrated in an example, the drive mechanism 140 may act on the energy application tool 110 to cause it to rock on a pivot 110a, causing it to move in direction A at its tip. The drive mechanism 140 may utilize, for example, an alternating magnetic element which may act on the energy application tool 110 to cause it to move alternatingly in two directions, such as up and down. In another example, the bend portion of the L-shaped energy application tool 110, such as shown with bend 110b, may include a flexing and/or deformable construction such that a linear force applied by the drive mechanism 140 may push the energy application tool 110 in the direction A at the tip by conveying the forward motion around bend 110b. For example, the bend 110b may include a braided, segmented, spring-like and/or otherwise bendable section that may also convey motion and/or force around a bend. In general, the shape of the L-shaped energy application tool 110 may generally include other angles besides 90 degrees, such as between approximately +/−45 degrees from the rearward portion 110d. In some embodiments, the energy application tool 110 may also include multiple portions which may be separable, such as portions 110c and 110d, such that, for example, the portion 110c may be removed and disposed between uses or patients, such as to aid in preventing cross-contamination. In general, the separable portions may include an interface to couple them for use in a measurement such that they substantially act as a unitary energy application tool 110, as described below.

Figure 18B:
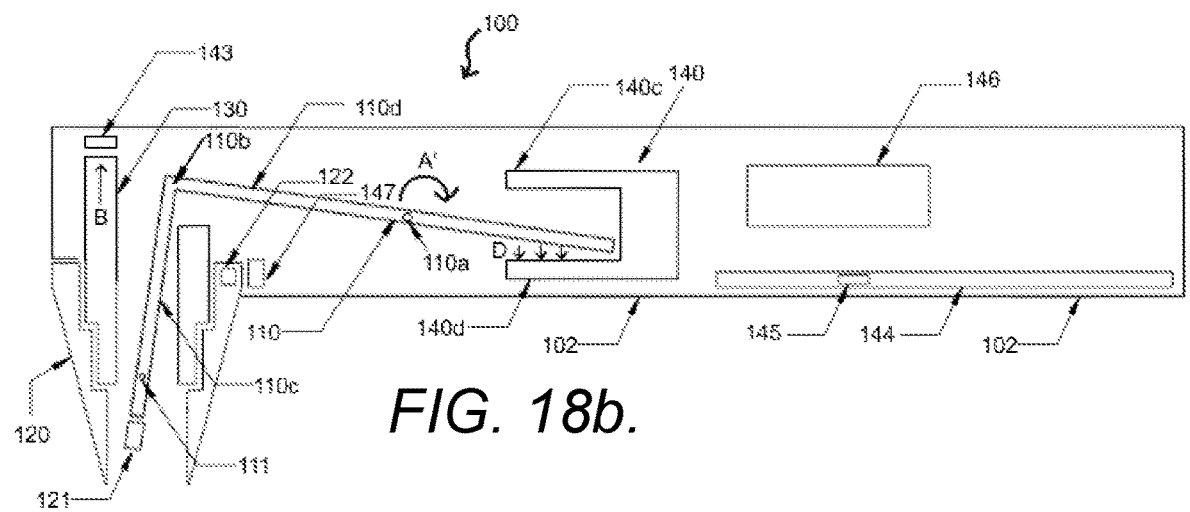
Figure 18C:
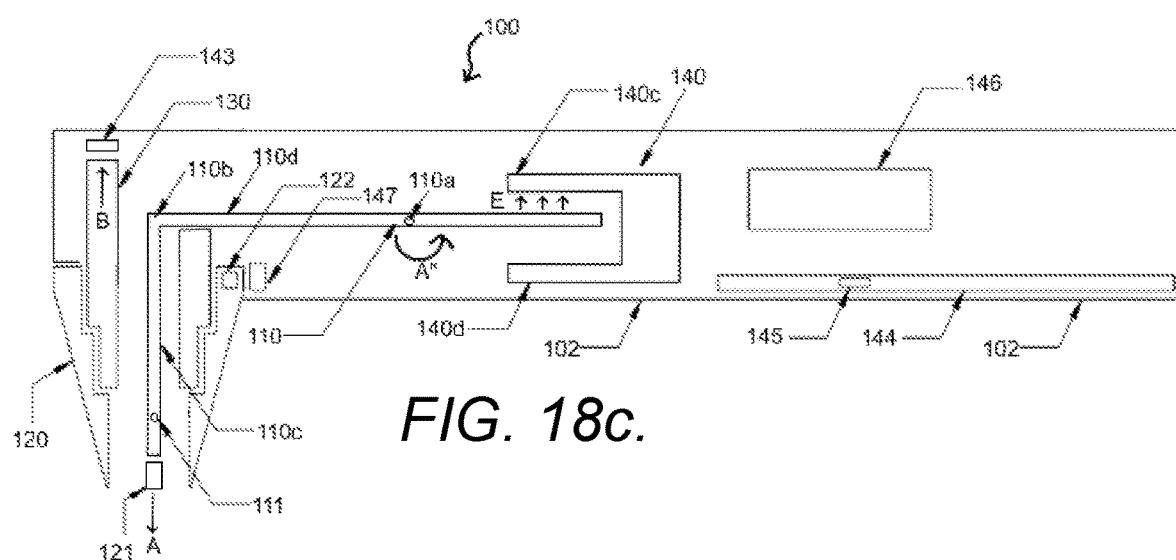

In some embodiments, the L-shaped energy application tool 110 may rock on a pivot 110a, such as, for example, with an external force applied from a drive mechanism 140, as shown in FIGS. 18b and 15c. For example, the drive mechanism 140 may apply alternating forces to the energy application tool 110 to cause it to rock about the pivot 110a, such as with a force applied D from portion 140d applied to the rearward portion 110d to cause rocking in direction A' away from a target object, as shown in FIG. 18b, or with a force applied E from portion 140c applied to the rearward portion 110d to cause rocking in a direction A" toward the target object such that the energy application tool 110 is driven in direction A, as shown in FIG. 18c. The forces D and E may be applied by any appropriate method, such as, for example, by applying a magnetic force on the energy application tool 110, which may contain a magnetic or metallic element which may respond to the application of force from the drive mechanism 140. In general, the shape and arc of the rocking motions A' and A" may be designed such that the energy application tool 110 impacts the target object in a direction substantially perpendicular to the target object surface, as shown with the rocking A" into a substantially vertical orientation of the bent portion 110c around bend 110b in FIG. 18c. To reset the device 100 for a subsequent measurement, the portion 140d may apply a return force D, as shown in FIG. 18b, to cause rocking A' to return the energy application tool 110 to a withdrawn or resting state. In general, the interior of the device 100 may be adapted to allow for the rocking motions A' and A" without interfering with the energy application tool 110.

Other examples of endpoint devices may include, for example and without limitation, those described in U.S. Pat. Nos. 6,120,466, 9,869,606, U.S. patent publication No. 20190331573, and/or PCT publication WO2019133946, which are incorporated by reference in their entireties.

Any of the devices described above, for example, a handpiece 100, delivers a free-floating or substantially free-floating energy application tool, such as the energy application tool 110 or 120, for example, a tapping probe to the object, for example a tooth and/or implant with a consistent kinetic energy just prior to each percussion of the object. From the resulting data, the energy returned to the energy application tool normalized by the kinetic energy of the energy application tool prior to impact vs time may be determined and analyzed. The response, such as a percussion response is plotted as Percent Energy Return (ER) on the vertical axis and Time (micro seconds or µs) on the horizontal axis. Each ER value is measured and plotted, at time increments of, for example, 4 µs along the horizontal axis. The vertical axis may autoscale to the highest ER value and the horizontal axis may range from 0 to 0.5 ms (milliseconds), as shown in the percussion response curves of FIGS. 4 and 5. The numerous ERGs of FIGS. 4 and 5 may be representative of tests on numerous defect free objects or numerous objects with defects, respectively.

Figure 4:
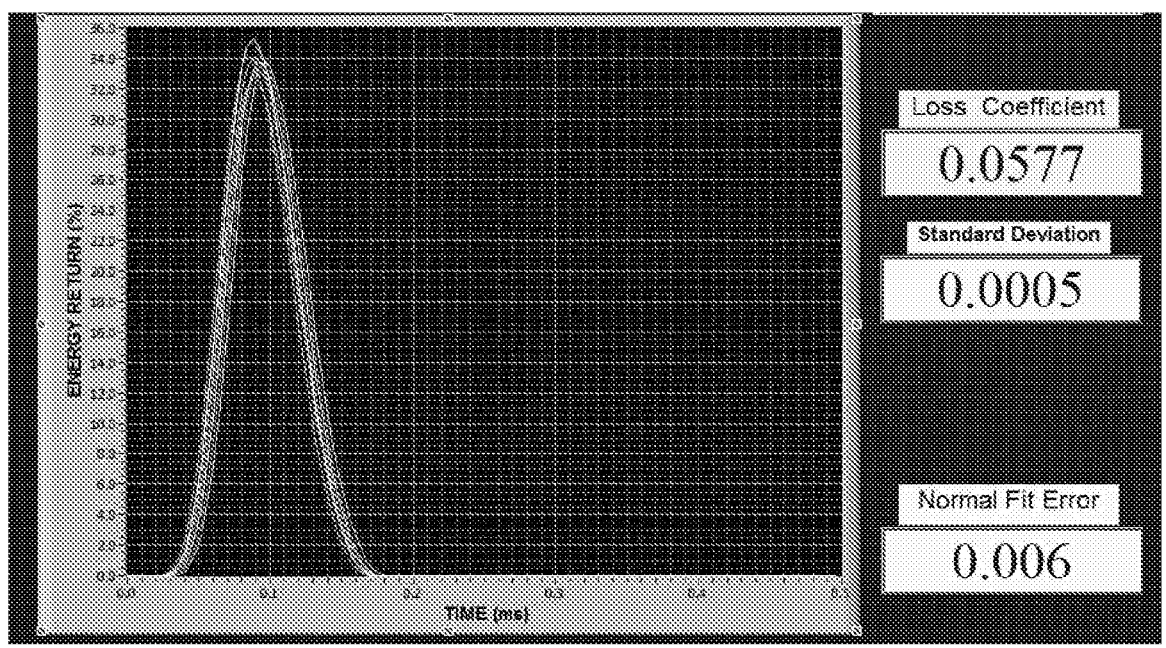
FIG. 4 illustrates an energy return graph of an undamaged tooth.
Figure 5:
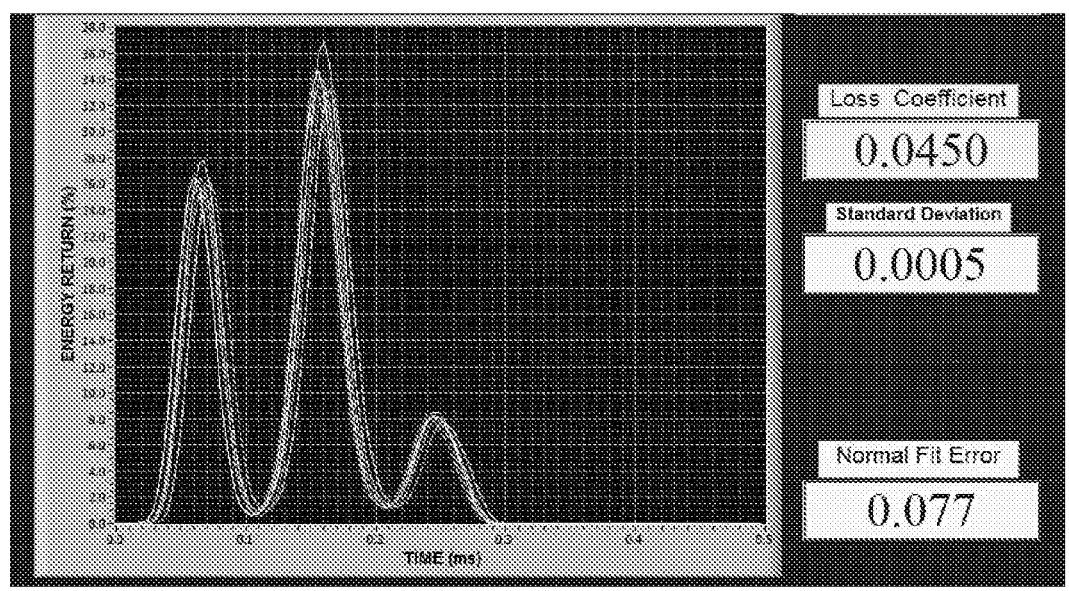
FIG. 5 illustrates an energy return graph of a tooth with damage.

The same percussion response as shown in FIGS. 4 and 5, from a tooth or an implant may be analyzed by two different methods. The first method analyzes the percussion response for the tooth/implant mobility using Loss Coefficient (LC) characteristics whereas the second method analyzes the same percussion response for the tooth/implant internal/proximal mobility using Normal Fit Error (NFE) characteristics. The results of the percussion response for a dental setting, including ER graph, LC and NFE values are displayed on the computer screen for the clinician's review. Thus each one of the curves in FIGS. 4 and 5 illustrate typical representations of computer screen displays of percussion responses for a tooth with no pathology and with structural pathology, respectively.

The device may be coupled to a computer that uses an additional path to analyze the percussion response to generate mobility of the object and its associated fixed structures for example, teeth and/or implants. The software assesses the characteristics of the teeth and implants by identifying the presence of any structural characteristics or pathology (e.g. crack) within the internal and/or proximal structure of tooth or implant. As the tooth structure breaks down over time due to the normal tooth/implant wear and parafunction, the level of structural pathology may increase over time resulting in development of additional mobility.

Figure 16:
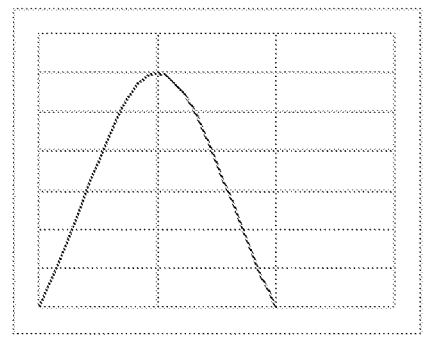
FIGS. 16, 16a, 16b and 16c illustrate general Energy Return Graphs (ERGs) from teeth having different levels of pathology.
Figure 16A:
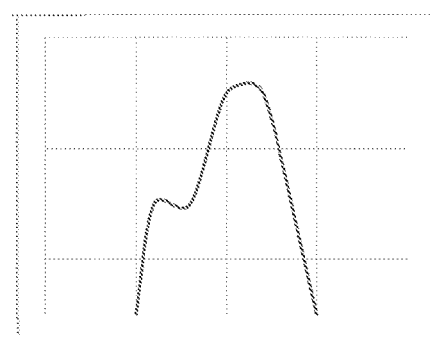
Figure 16B:
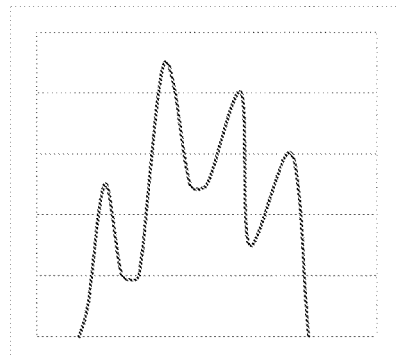
Figure 16C:
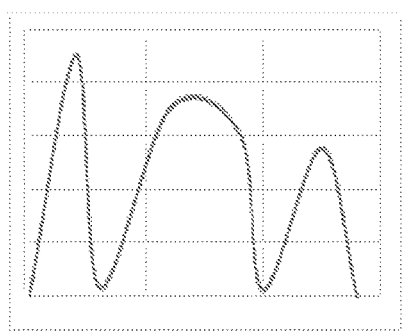

The clinical implication is the higher the mechanical interaction between the structures within the site the higher the internal/proximal mobility detected by the device described above. Additional site mobility is demonstrated in the Energy Return Curve or Energy Return Graph (ERG) by the shape of the curve. Specifically, the more structural pathology there is within the structure of the site (internal/proximal), the more the shape of the curve deviates from a uniform single peak. In addition, the software uses Levenberg-Marquardt algorithm to characterize the shape of the curve in terms of Normal Fit Error or NFE: higher NFE values are associated with greater additional mobility within the internal and/or proximal structure of tooth and/or implant. FIGS. 16, 16a, 16b and 16c illustrate generally characteristic ERG shapes that correspond to different levels of pathology. FIG. 16 shows a generally normal tooth with no structural pathology, FIG. 16a shows a generally mild level of pathology (as shown with the small additional peak), FIG. 16b shows a generally moderate level of pathology (as shown with the multiple small to medium peaks), and FIG. 16c shows a severe level of pathology (as shown with the large additional peaks).

Any of the devices described above, for example, a handpiece, delivers a free-floating energy application tool, for example, a tapping rod to the object, for example a tooth and/or implant with a consistent kinetic energy just prior to each percussion of the object. From the resulting data, the energy returned to the energy application tool be normalized by the kinetic energy of the energy application tool prior to impact vs time is determined and analyzed. The percussion response is plotted as Percent Energy Return (ER) on the vertical axis and Time micro seconds (or μs) on the horizontal axis. Each ER value is measured and plotted, at time increments of, for example, 4 μs along the horizontal axis. The vertical axis may auto-scale to the highest ER value and the horizontal axis may range from 0 to 0.5 ms (milliseconds) (get one curve form addition explanation paper). The energy return curve shown in FIG. 4 represents an object without any defects, as shown with a single peak without accessory peaks. In FIG. 5, an energy return curve for an object with defect is shown, as shown with the main peak and an additional peak that indicates damage.

In general, when a percussion device is used, the Normal Fit Error (NFE) may be determined as follows:
1. The Defect Severity Quotient (DSQ) is equal to NFE× 1000.
2. The Damage (D) is given by D=27×ln(DSQ)−61, where ln is the natural logarithm.

As noted above, the force may be determined by a sensor coupled to the energy application tool. The energy return data generated in a test is normalized before the fit to these data is performed to make the fitting process simpler. In other words, for an energy application tool that is a tapping rod, the equation to be fitted is for $E_r/E_{rmax}$ instead of just the energy return, $E_r$, where $E_r$ is the energy return, which characterizes the elastic energy of this force measurement. For example, $E_r$ is defined as $E_r=F^2/2K$, where F is the resultant percussion force and K is the stiffness of the energy application tool, for example, the tapping rod assembly. The normalized energy return, $E_r$ is the energy return during impact divided by the kinetic energy of the taping rod just before impact with the sample. The energy return/impact energy variation with tie for a defect-free calibration sample could be expressed in the form:

$$\overline{E}_r = \beta \sin^2(\gamma t) \exp\left[-\frac{(t-\phi)^2}{\psi}\right]$$

where t is time and β, γ, φ, and ψ are parameters that are determined via a nonlinear regression fit to measured data. The NFE is equal to the cumulative error between the normalized measured data and a nonlinear regression fit of the equation above to the normalized measured data. Thus, the NFE represents that overall difference between the shape of an ideal energy return response for a defect-free sample and that for the measured data.

In general, the loss coefficient may be derived from damping characteristics of an object, for example, tooth and implant. After application of kinetic energy to the object, the relative extent to which the object deforms inelastically and dampens elastic energy may be characterized as its loss coefficient, η, given by:

$$\eta = D/2\pi U$$

where D is the total energy dissipated (or lost) per unit volume and U is the elastic energy per unit volume. The stability index (SI) is equal to $Fp^2/Fc^2 \times 100$ where Fp is the maximum percussion force measured by the sensor in the percussion rod for the sample tested and Fc is the maximum percussion force for a stiff calibration sample (e.g. aluminum alloy or stainless-steel block). Other calibration materials may also be used. The Mobility is equal to 100-SI.

In the Annotation aspect of the invention, which may form part of the Acquisition aspect, a system may include an annotation user interface for collecting annotations, such as expert annotations. These annotations may associate data records for physical objects such as teeth with a label naming a specific defect indication, such as "loss of cement seal", "oblique crack", etc. For each such annotation, the interface may allow at least one device measurement to be captured for at least one, for example, tooth of a single patient and for at least one clinical finding of the physical condition of the teeth to be inputted for the teeth. In other embodiments, the interface for collecting expert annotations may use a pictorial diagram of the object and other surrounding objects, for example, a depiction of a patient's lower and/or upper jaw. In some embodiments, the tooth measurement and annotation may be captured at the same time. In other embodiments, the annotation may be captured independently from (for example, at a later point in time relative to) any target device measurement.

In some exemplary embodiments, a user may enter an annotation by selecting one or more matching categories from a single-level or multi-level ontology, e.g., crack in restoration (crown, filling, etc.), crack between restoration and tooth (microleakage, open margins, decay, etc.), crack between tooth and bone (infection, orthodontic origin, trauma origin, etc.), enamel cracks, etc.

In some embodiments, the device measurements and/or expert annotations may be stored using a distributed computing environment, such as a cloud. Storage on, for example, a cloud may allow multiple expert annotations to be collected simultaneously and decrease the time for accumulating an expert annotation dataset in order to improve prediction accuracy. In some embodiments, device measurements and/or expert annotations may be collected on multiple instances of the system and consolidated onto one or more of those instances. In some embodiments, the device measurements and/or expert annotations entries may be encrypted.

Figure 6:
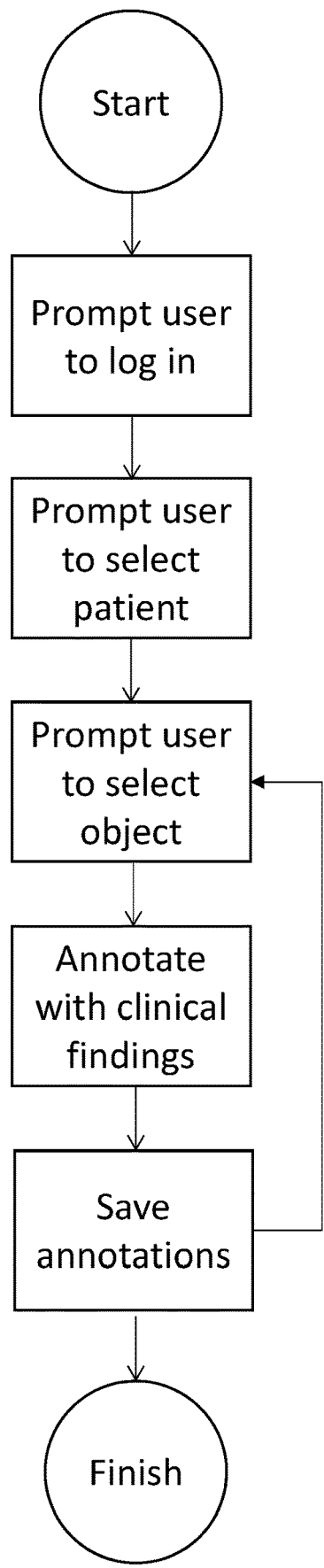
FIG. 6 illustrates the operation of an endpoint device by an operator for entering annotations.

FIG. 6 illustrates an embodiment of the operation of the endpoint device by a user for entering annotations. Such a user may generally be an expert practitioner for entering annotations such that, for example, the records may be annotated properly. First, the endpoint device presents a login screen to the expert, in order to establish his/her identity, and this identity is checked via a call to the central server. The expert then sees a menu of device measurement records, possibly across multiple patients, from which to choose to work on, based on data stored on the central server. After the expert selects one of these records, the endpoint device presents a screen showing the physical objects, for example teeth, to be annotated. The physical objects may be laid out in a graphical form, such as in the shape of a jaw, in order to more easily navigate to one specific object based on its anatomical location relative to other objects. The endpoint device prompts the expert to select a single tooth and annotate the tooth's record with any discernable clinical findings and/or other data, if any, such as whether a crack exists or if a filling or crown is present. Annotations are stored on the endpoint device and/or the central server. This process may then be repeated until the expert has completed all annotations the expert is able to enter.

Figure 8:
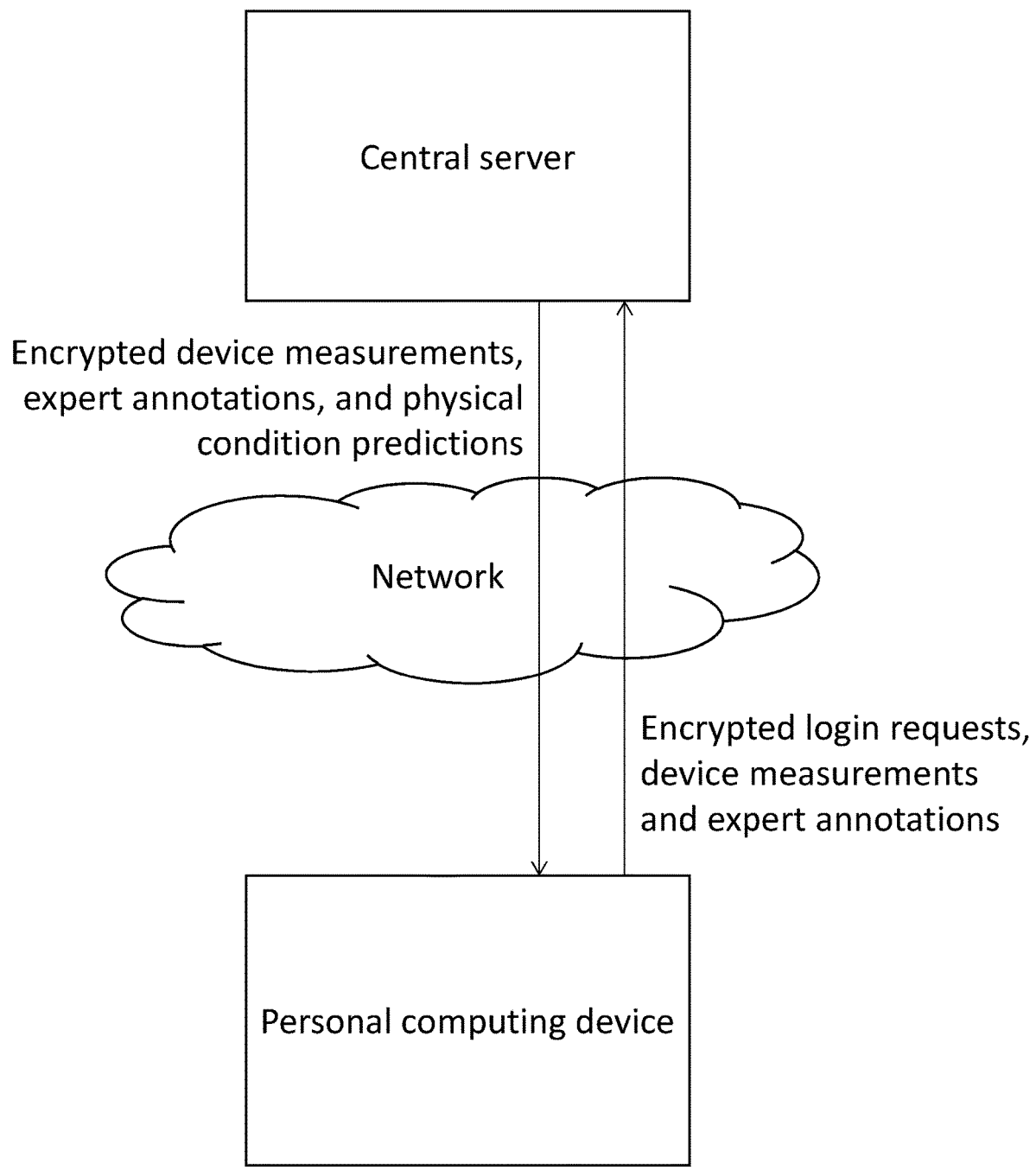
FIG. 8 illustrates connectivity of an endpoint device with a server.

FIG. 8 shows an embodiment of the connectivity between an endpoint device and the central server. During operations such as logging in and saving of device measurement data and/or annotations, network connections may be established to the central server. These network connections may generally be established over a public network such as the Internet or a private network. The connections may further be encrypted, such as to prevent interception or tampering of records and/or to comply with government regulations. The central server may also use these connections to return previously saved device measurement records, annotations, and physical condition predictions to the endpoint device. Network connections may use a standard protocol/convention for transmitting requests and responses, such as Representational State Transfer over Hypertext Transfer Protocol (REST/HTTP) and JavaScript Object Notation (JSON).

Figure 11:
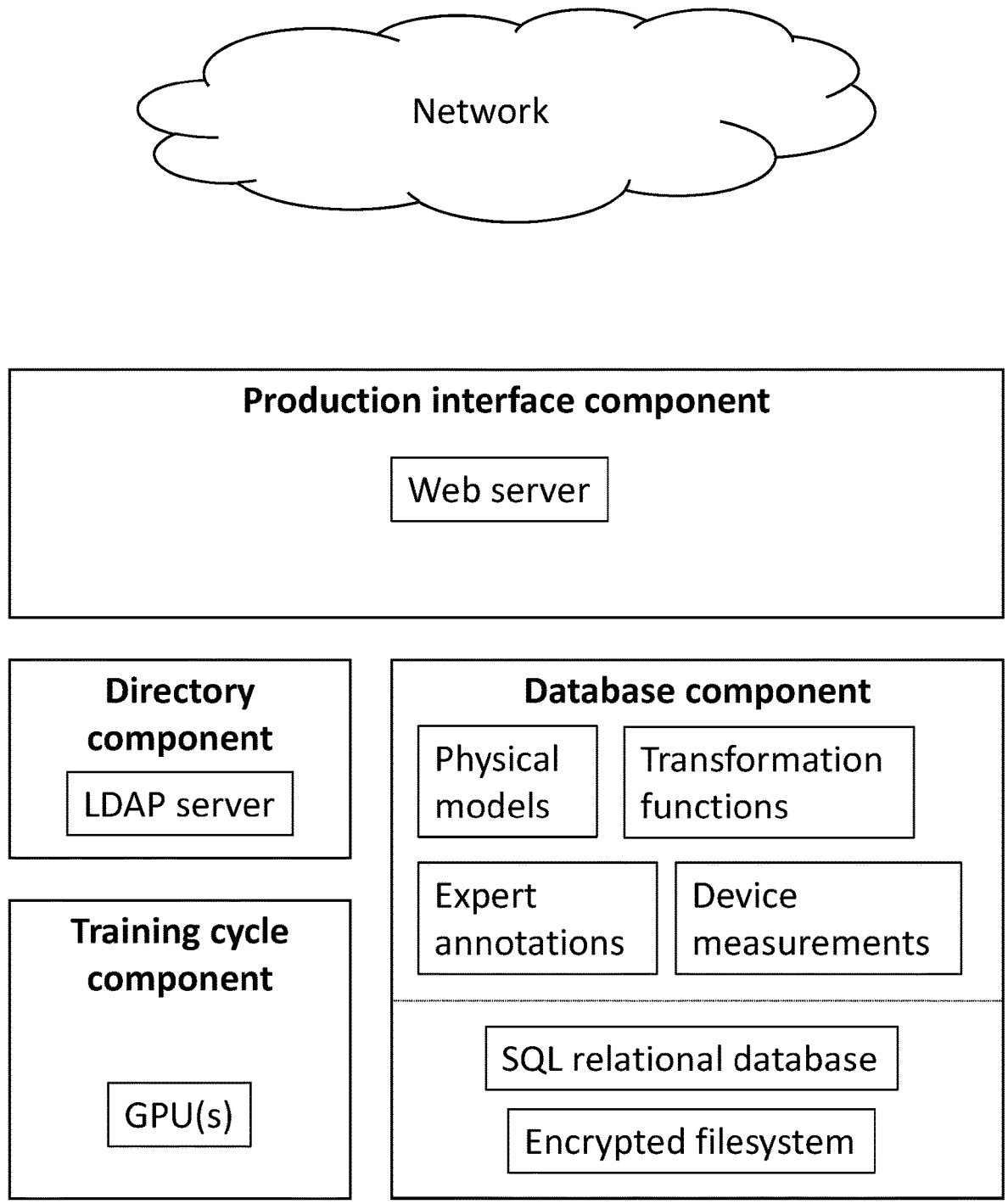
FIG. 11 illustrates an example of server architecture of the present invention.

FIG. 11 shows an embodiment of the architecture of the central server. The central server may physically reside on a single computer or across a set of multiple computers connected by a private network. One component of the central server is responsible for storing and managing user credentials for the users of the endpoint devices. This component may use standard technologies such as Lightweight Directory Access Protocol (LDAP) or another directory server. The other components delegate all user management and authentication of users during information exchanges over the network to this component. Another component is responsible for storing and managing data from the Acquisition aspect (e.g. the Collection and/or Annotation), such as the device measurement data, annotations, transformation functions, and physical simulation models, potentially in an encrypted form. This component may use standard technologies such as a SQL relational database and filesystem-level encryption built into operating systems such as Linux. Yet another component is responsible for running training cycles in the Training aspect, in which data from the data management component is retrieved on a periodic basis and fed into a machine learning algorithm. This component of the central server may typically be equipped with graphics processing units (GPUs) to accelerate machine learning tasks. A final component is responsible for exposing a production interface that accepts requests from endpoint devices for use in the Prediction aspect, such as for predicting physical conditions of objects, for example teeth, once provided with a set of device measurements. The components of the central server communicate with one another and/or directly with endpoint devices in order to service requests that are received via the network from endpoint devices.

In the Training aspect, as discussed additionally above, a system trains at least one machine learning model to produce at least one transformation function using the data collected in the Acquisition aspect or Collection aspect and the annotations collected in the Acquisition aspect or Annotation aspect. In some exemplary embodiments, a combination of one or more of the device measurement data, ancillary data, simulated data, and expert annotations (the combination being referred to as "ground truth data"), may be utilized in training a machine learning model on the patterns that exist in device measurements, ancillary data, and/or simulated data, and the resulting transformation function may be used to predict the true condition of an object, for example, an anatomical object such as a human tooth. Applied repeatedly when new and/or updated ground truth data and/or annotations are introduced, the process may be capable of generating better and more accurate predictions.

Figure 12:
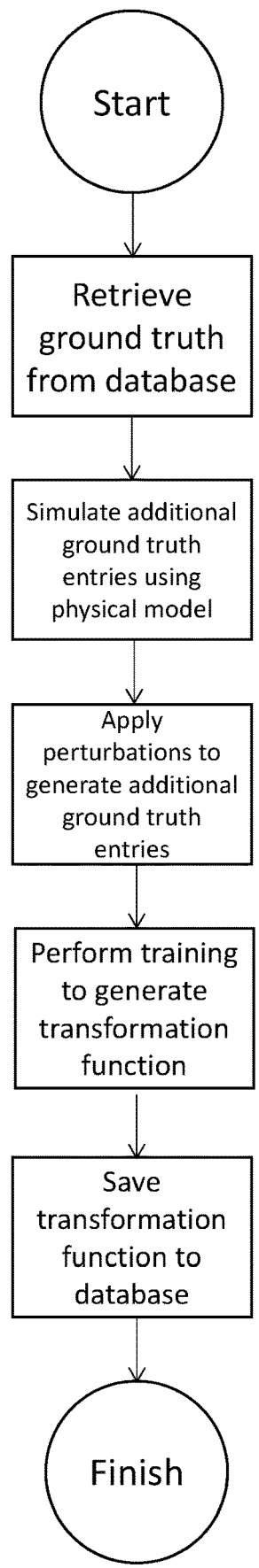
FIG. 12 shows the process by which the training phase is performed when at least one trigger fires.

FIG. 12 shows an embodiment of the process by which the training phase is performed when at least one trigger fires. A trigger may be based on an event such as for example the introduction of new annotations, based on a pre-established timing interval, and/or based on a manual triggering by a user. When a trigger fires, the central server retrieves relevant ground truth data from the device measurement and annotation database component. A physical simulation model is applied to generate additional ground truth dataset entries to be included. The machine learning training algorithm is then performed, and this may take a long time to execute. At the end of the training, the resulting transformation function is then saved to the database component.

Figure 13:
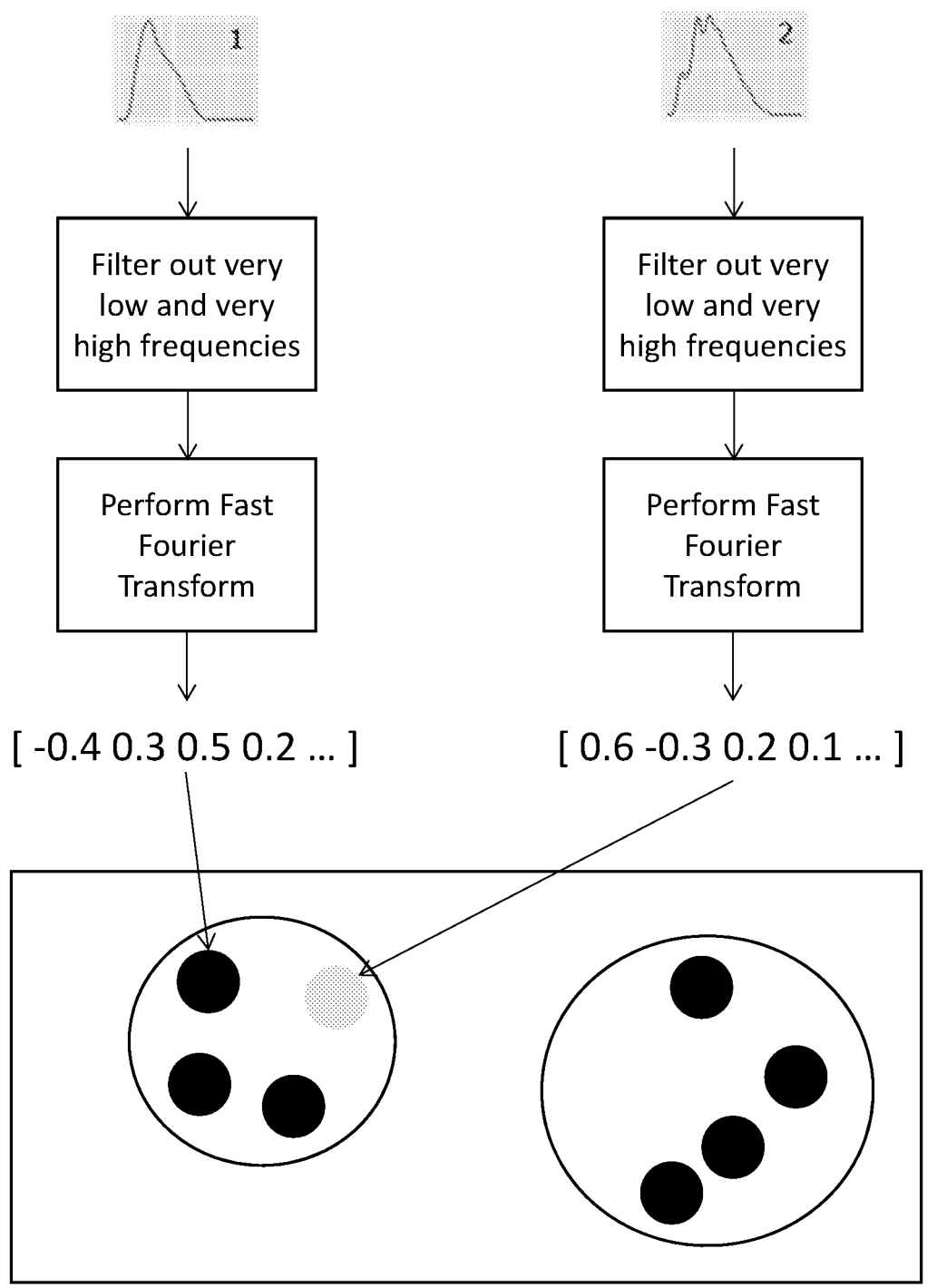
FIG. 13 shows the process by which unsupervised clustering is performed and a transformation function is generated.

FIG. 13 shows an embodiment of the process by which unsupervised clustering is performed and a transformation function is generated. First, at least one device measurement, for example, waveform data from a probe device, may be passed through a filter to remove high and low frequencies. Then, transformations such as a Fast Fourier Transformation may be used to convert the data into a form more useful for a machine learning algorithm, such as a feature vector comprised of frequency components. The feature vectors are then assembled together within the feature space and clustered using a technique such as k-means clustering. Each cluster is analyzed to identify the most prominent clinical findings that are associated with the cluster's device measurements as recorded inside annotations. The generated transformation function is thus configured to accept a device measurement, perform the same filtering and transformation steps described above, place the generated feature vector in the feature space, and return the clinical findings determined to be most prominent in the cluster that is the closest match to the generated feature vector.

Figure 9:
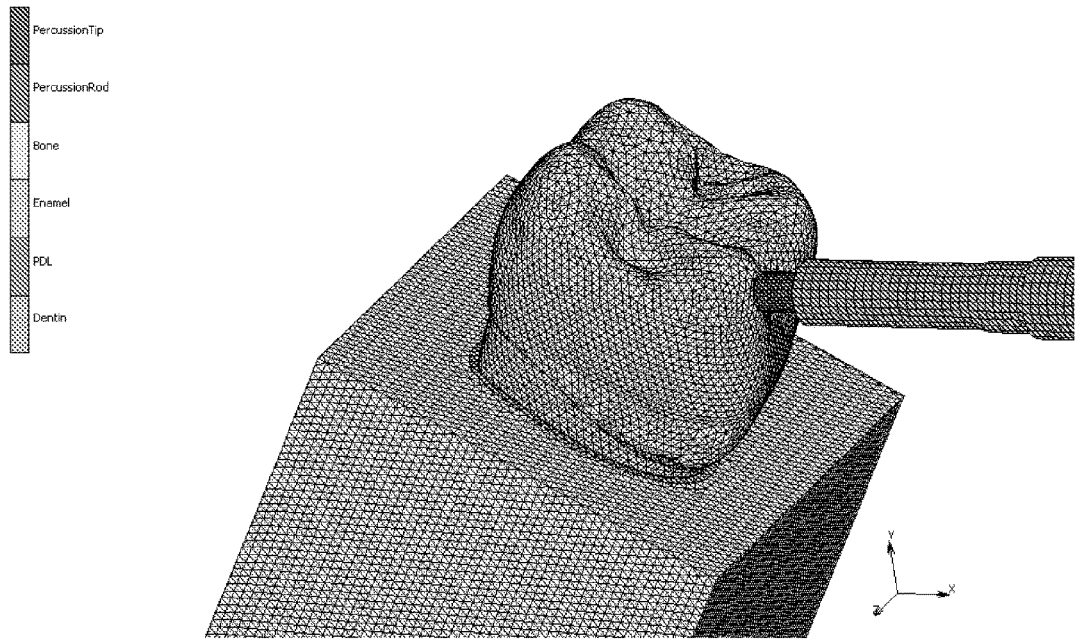
FIG. 9 shows an example of a finite element model (FEA) used as a physical simulation model.

The present invention may also include a simulation model component, which may form part of the Training aspect. FIG. 9 shows an example of a finite element model (FEA) used as a physical simulation model. This analysis method may involve the use of numerical models to simulate actual testing using the device described herein. In general, modeling and simulation may be desirable for training the system and its predictive capabilities with simulated models that may embody test objects that have not been tested, are not readily available for actual physical testing, etc.

Figure 10:
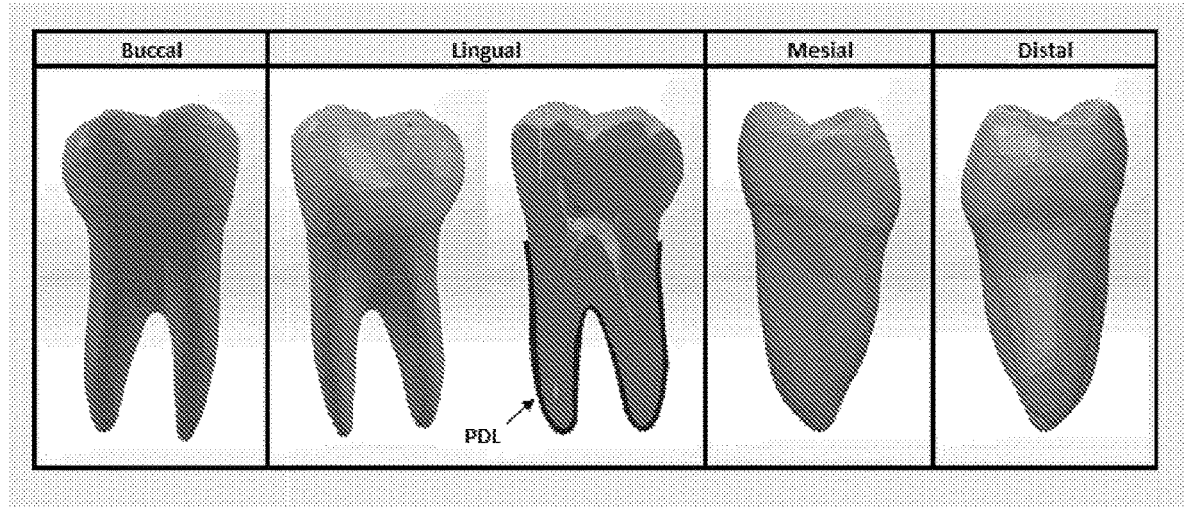
FIG. 10 illustrates examples of physiological models of teeth and surrounding anatomy.

In an example of the modeling, a physiologically accurate 3D model of a mandibular second molar (site 18) was created using a solid modeling computer-aided design program using 3D x-ray computer tomography tooth data, but the same process may be applicable to other teeth as well as other solid objects. The models include both enamel and dentin together with a pulp chamber, the periodontal ligament (PDL) and surrounding bone, examples of which are shown in FIG. 10.

The solid models were then exported to a computer-aided engineering program for meshing the solids. A non-linear finite element solver may be appropriate for modeling nonlinear material behaviors such as those reported for the PDL as well as transient environmental conditions including percussion were used. It was necessary to include a percussion rod in the present simulation models to fully analyze a percussion event using comparisons with experimental data. The elastic modulus of the percussion rod, its mass and an initial velocity were inputted into the program. The resultant percussion force was measured by a piezoelectric sensor in the rod.

The percussion response from the measurement was plotted as an Energy Return (ER) versus time curve. Examples of energy return versus time curves are shown in FIGS. 4 and 5, for an object without defects and one with defects, respectively.

The FEA models may include a large number of elements, for example, about 500,000 to about 1,000,000 elements each (FIG. 9). A second-order isoparametric three-dimensional 4-node tetrahedron for the PDL, an 8-node, isoparametric, arbitrary hexahedral for the percussion probe, and a linear isoparametric three-dimensional tetrahedron for the rest of the model may be used. Boundary conditions may be defined to minimize or prevent free body motion so that the elements on the outer surfaces of the object, for example, the bone may be constrained. The models were run with a time increment of for example, 4 μs.

A direct integration method may be used to obtain the solution to the equations of motion for the models. Additionally, viscous damping may be included in the analysis using classical Rayleigh Damping (RD) which is convenient for an incremental approach to a numerical solution. The damping matrix D is defined as a linear combination of the mass and stiffness matrices of the system and damping coefficients are specified on an element-by-element basis. Rayleigh damping uses coefficients on the element matrices and is represented by the equation $$D = \sum_{i=1}^{n}\left\{\alpha_i M_i + \left(\beta_i + \gamma_i \frac{\Delta t}{\pi}\right)K_i\right\},$$

where D is the global damping matrix, $M_i$ is the mass matrix multiplier for the $i^{th}$ element, $K_i$ is the stiffness matrix multiplier for the $i^{th}$ element, $\alpha_i$ is the mass damping coefficient on the $i^{th}$ element, $\beta_i$ is the usual stiffness damping coefficient on the $i^{th}$ element, $\gamma_i$ is the numerical damping coefficient on the $i^{th}$ element, and $\Delta t$ is the time increment. The same damping coefficients may be used throughout the PDL in a given model. The mechanical properties of, for example, the hard dental tissues (i.e. other than the PDL) are assumed to have linear-elastic and isotropic behavior following $\sigma_{ij} = C_{ijkl}\varepsilon_{kl}$, where the nonzero components of $C_{ijkl}$ are a function of elastic modulus E and Poisson's ratio.

In the Prediction aspect, as discussed additionally above, a system applies transformation functions to predict one or more structural defect classifications. In some exemplary embodiments, the transformation function used for prediction is chosen from the transformation functions generated in the Training aspect. In some embodiments, a predefined, canonical transformation function may be included and used to perform predictions. In some exemplary embodiments, the transformation function used may be based on a standardized predictive model.

Figure 7:
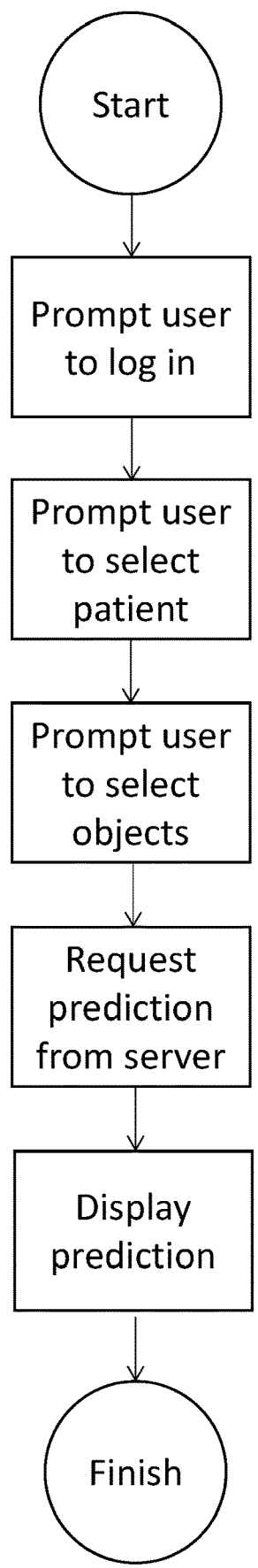
FIG. 7 illustrates the operation of an endpoint device by an operator for retrieving predictions.

FIG. 7 illustrates an embodiment of the operation of the endpoint device by a user, such as an expert practitioner, for retrieving predictions. This may generally assume that another user, such as a technician, has already followed the steps as illustrated in FIG. 2. The endpoint device or associated computing device may present a login screen to the expert, in order to establish his/her identity, and this identity is checked via a call to the central server. The expert then sees a menu of device measurement records, possibly across multiple patients, from which to choose to work on, based on data stored on the central server. After the expert selects one of these records, a button is shown to allow the expert to request the predicted physical conditions of at least one physical object, such as a tooth, from the central server. The predicted physical conditions may then displayed.

Figure 14:
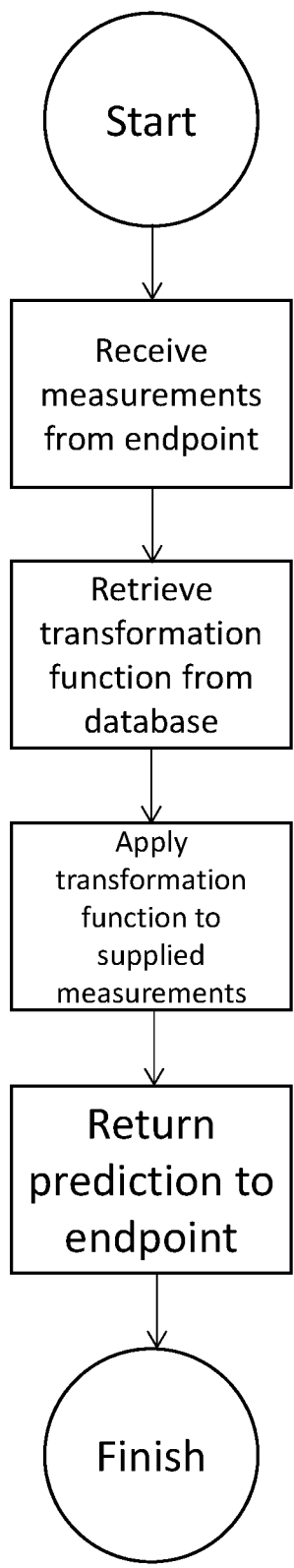
FIG. 14 shows the process by which the production interface performs predictions.

FIG. 14 shows an embodiment of the process by which the production interface performs predictions. First, a set of device measurements for objects, for example teeth, are supplied to the interface by, for example, an endpoint device. Next, a transformation function is selected from the database and loaded into memory. Afterwards, the transformation function is applied to the device measurements and a result is rendered. Finally, the result is returned to the endpoint device.

Figure 15:
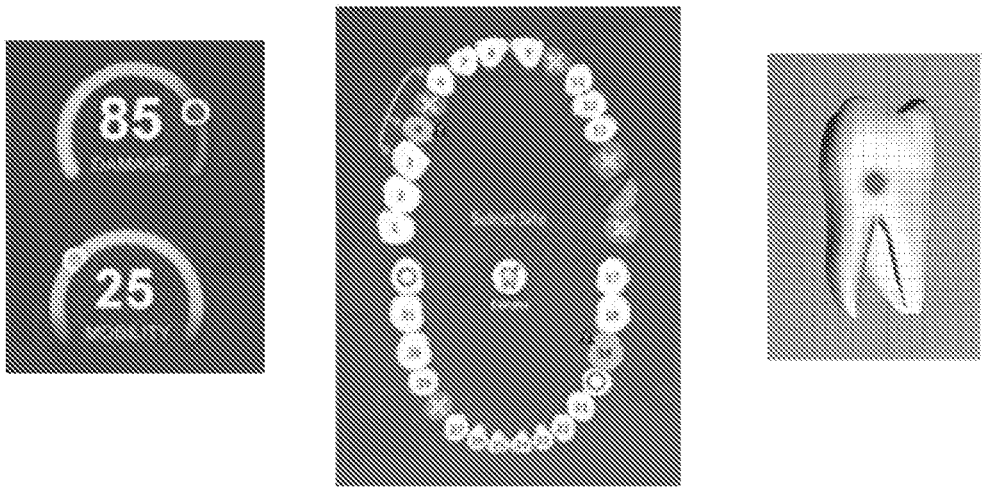
FIG. 15 shows an example of a screen that displays predicted results.

FIG. 15 shows an example of a screen that displays predicted results. One area may show identifying information for the source of the objects being examined, such as for example the patient. Other areas of the screen may be used to depict for example the location of the object being examined relative to other objects, the predicted location of the damage relative to the object being examined, and/or any computed quantitative scores derived from the underlying device measurements. Predicted labels may be displayed in an easy-to-understand form, such as an indication such as "Cement Failure", the restorative condition such as "crowned root canal", the urgency such as "red", and the location of the damage such as "vertical to root". The certainty score of the prediction may be presented as for example a probability score such as "97%". Additional information based on the predictions may also be presented under an area such as "clinical considerations".

In an example, when an operator uses the system to examine a tooth, the endpoint device, such as a handpiece, collects the ERG for the tooth and sends it to the local computer and/or to the integrated computing components of the endpoint device, as applicable. The local computer or integrated computer calculates some parameters (such as Damage and Mobility) from the raw data. At the end of the exam, the local computer puts the raw data, calculated parameters, and meta data in the correct format and uploads it to a cloud server. The cloud server analysis the data it receives a, makes predictions about the structural integrity of the teeth using pre-trained machine learning algorithms. The cloud sever then sends the predictions and insight as a code to the local computer. The local computer reads the code, looks up the definition of the codes in a local database, and displays the prediction text in the local software. If the code does not exist in the local database, the system will look up the master table which is hosted in a cloud database and replicates the table locally. All subsequent predictions will be looked up in the local database until the cloud database changes.

Although the invention has been described with respect to specific aspects, embodiments and examples thereof, these are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In general, references to the "cloud" may include both internet connected computing services and/or resources, or those that may exist on smaller or private networks.

In general, "program logic modules" and software elements may generally be configured onto, run, stored, processed and/or executed on separately on different computer processors and/or memories, in combination with each other on the same computer processors and/or memories, and/or on any of the above in varied temporal arrangements, as applicable. Nothing should be implied or construed in this specification as requiring any program logic modules and/or software elements to be run on any one or combination of computing processors and/or memories, and any suitable combination or singular unit may be utilized.

References throughout this specification to "one embodiment", "an embodiment", or "a specific embodiment" or similar terminology mean that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein, the meaning of "in" includes "in" and "on" unless the context clearly dictates otherwise.

The invention claimed is:

1. A machine learning system including a computer for evaluating the structural characteristics of physical objects, the system comprising:

a device having an energy application tool capable of applying energy to an object to generate a measurement and an interface to the computer for storing the device measurements; a first program logic module exposing an annotation user interface for collecting, from a user, annotations on device measurements regarding the structural characteristics of the measured physical objects;

a second program logic module executing a training cycle for training a machine learning algorithm on a ground truth dataset comprised of stored device measurements and annotations to create a transformation function; and a third program logic module exposing a production interface for performing predictions on said device measurements utilizing said transformation function.

2. The machine learning system of claim 1, wherein the ground truth dataset is augmented with simulated entries based on a physical simulation model.

3. The machine learning system of claim 2, wherein the physical simulation model is incrementally improved to better fit the device measurements collected.

4. The machine learning system of claim 1, 2 or 3, wherein said device measurements and/or annotations are linked to records from an information system that identifies the origin, location, or owner of the physical objects measured.

5. The machine learning system of claim 1 wherein at least one of device measurements and annotations comprises provenance information.

6. The machine learning system of claim 5, wherein provenance information is captured during taking of said device measurements and/or the entering of annotations.

7. The machine learning system of claim 5, wherein said provenance information comprises the name of the personnel collecting the device measurements, the facility location, the date/time of collection or combinations thereof.

8. The machine learning system of claim 1 wherein said device measurement further comprises additional findings supplied by a user.

9. The machine learning system of claim 8, wherein the device measurements in the ground truth dataset and those findings supplied by said user for prediction are preprocessed to filter out noise, transformed into a feature vector comprised of numerical quantities, or combinations thereof.

10. A computer-implemented method for evaluating the structural characteristics of physical objects, comprising:

capturing device measurements generated by using an energy application tool capable of applying energy to an object to generate a device measurement, said energy application tool is part of a device for performing said device measurement;

annotating said device measurements with annotations regarding the structural characteristics of the measured physical objects;

training a machine learning algorithm with a ground truth dataset comprised of device measurements and annotations to produce a transformation function; and applying said transformation function on captured device measurements to predict the structural characteristics.

11. The method of claim 10, further comprising applying a physical simulation model to augment said ground truth dataset with additional simulated entries.

12. The method of claim 10 further comprising running said training of said machine learning algorithm on a fixed schedule, when triggered by an event, or combinations thereof.

13. The method of claim 12 wherein said triggering event comprises the addition of an additional ground truth dataset entry.

14. The method of claim 10 further comprising a review process for inspecting said transformation function by a user, for testing said transformation function by at least one validation methodology or combinations thereof.

15. The method of claim 10 further comprising linking said device measurements and/or said annotations to records from an information system that identifies the origin, location, or owner of the physical objects measured.

16. A computerized system for evaluating the structural characteristics of anatomical objects, the system comprising:

a device having an energy application tool capable of applying energy to an object to generate a measurement and an interface to the computer for recording and transforming the device measurement into a feature vector comprising an energy return versus time graph;

an annotation interface for recording a user annotation on said feature vector regarding the structural characteristics of the measured anatomical objects;

a training program for executing a training cycle adapted for training a machine learning algorithm on a ground truth dataset comprised of feature vector and user annotations to create a transformation function; and a production interface for performing predictions on said feature vector utilizing said transformation function.

17. The system of claim 16 wherein said training cycle is repeated on a fixed schedule or when triggered by at least one event.

18. The system of claim 17 wherein said transformation function is updated or improved during training cycle.

19. The system of claim 16, wherein the ground truth dataset is augmented with simulated entries based on a physical simulation model.

20. The system of claim 16 wherein said energy return versus time graph comprise a time-energy profile or a frequency-energy profile.

* * * * *